United States Patent [19]
Chang et al.

[11] Patent Number: 5,751,984
[45] Date of Patent: May 12, 1998

[54] METHOD AND APPARATUS FOR SIMULTANEOUSLY EXECUTING INSTRUCTIONS IN A PIPELINED MICROPROCESSOR

[75] Inventors: Hsiao-Shih Chang, Orange; James A. Kane, Newport Beach; Graham B. Whitted, III, Irvine, all of Calif.

[73] Assignees: United Microelectronics Corporation, Hsin Chu, Taiwan; Meridian Semiconductor, Inc., Irvine, Calif.

[21] Appl. No.: 922,741

[22] Filed: Sep. 3, 1997

Related U.S. Application Data

[63] Continuation of Ser. No. 609,051, Feb. 29, 1996, abandoned, which is a continuation of Ser. No. 252,411, Jun. 1, 1994, abandoned, which is a continuation-in-part of Ser. No. 193,000, Feb. 8, 1994, abandoned.

[51] Int. Cl.$^6$ ........................................................ G06F 9/38
[52] U.S. Cl. ............................................. 395/392; 395/394
[58] Field of Search ...................................... 395/392–395

[56] References Cited

U.S. PATENT DOCUMENTS

| | | |
|---|---|---|
| 5,129,067 | 7/1992 | Johnson . |
| 5,269,007 | 12/1993 | Hanawa et al. ........................ 395/375 |
| 5,313,644 | 5/1994 | Matsuo et al. ........................ 395/375 |
| 5,337,415 | 8/1994 | DeLano et al. . |

OTHER PUBLICATIONS

Kenji Minagawa, et al., "Pre–Decoding Mechanism for Superscalar Computers," *IEEE Pacific Rim Conference on Communications, Computers and Signal Processing*, May 9–10, 1991.

Peter M. Kogge, The Architecture of Pipelined Computers, McGraw–Hill Book Company. Hemisphere Publishing Corporation, pp. 95–99 and pp. 107–112.

Jean–Loup Baer, Computer Systems Architecture, Computer Science Press, Inc., pp. 135–215.

*Primary Examiner*—William M. Treat
*Attorney, Agent, or Firm*—Knobbe, Martens, Olson & Bear, LLP

[57] ABSTRACT

An instruction combination unit for a microprocessor compares multiple fetched instructions to determine whether they can be combined for simultaneous execution. The instruction combination unit compares destination registers of preceding instructions against source registers of subsequent instructions. If a subsequent instruction is to operate on a result of a preceding instruction before the result of the preceding instruction is available to the subsequent instruction, a data access conflict arises. The instructions are compared, and combined, if possible. Otherwise, execution of the subsequent instruction is stalled until the result from the preceding instruction is available to the subsequent instruction.

17 Claims, 9 Drawing Sheets

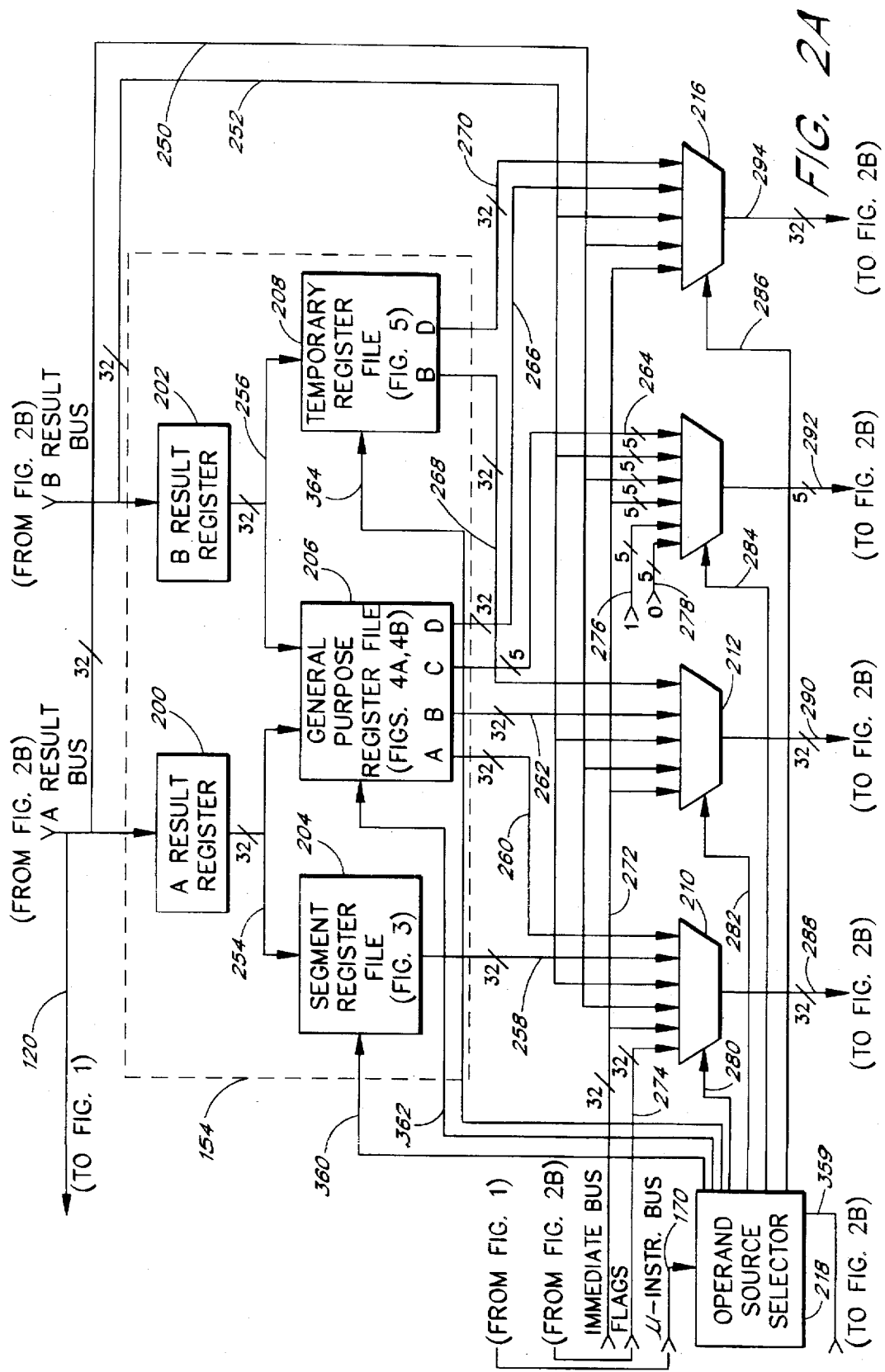

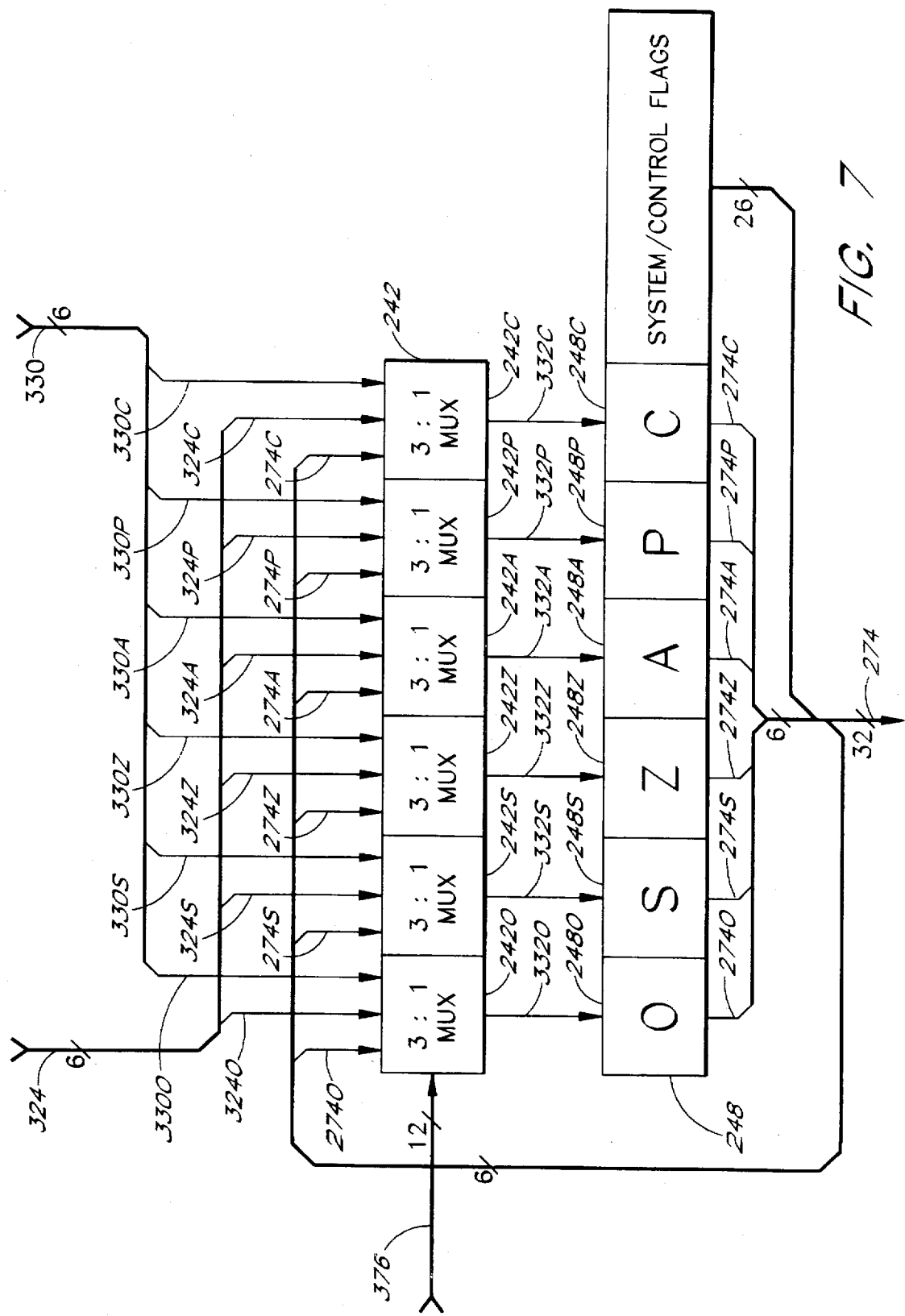

METHOD AND APPARATUS FOR SIMULTANEOUSLY EXECUTING INSTRUCTIONS IN A PIPELINED MICROPROCESSOR

This application is a file wrapper continuation of U.S. patent application Ser. No. 08/609,051, filed Feb. 29, 1996, now abandoned which was a file wrapper continuation of U.S. patent application Ser. No. 08/252,411, filed Jun. 1, 1994, now abandoned, which was a continuation-in-part of U.S. patent application Ser. No. 08/193,000, filed Feb. 8, 1994, now abandoned.

BACKGROUND OF THE INVENTION

1. Field of the Invention

The present invention is in the field of superscalar microprocessor design and control. In particular, the present invention relates to a method and apparatus for combining selected macro-instructions for simultaneous execution in a pipelined microprocessor.

2. Background Information

Although a computer program typically comprises a plurality of instructions that are generally arranged to be executed sequentially, superscalar computers often complete execution of some instructions out of sequential order. Although, the instructions are generally fetched and decoded in the order dictated by the program format, the execution of the instructions may not be completed in the same order because different instructions require different numbers of clock cycles for execution. For example, execution of an ADD instruction may be completed before a previously fetched memory LOAD instruction. The pipelined execution of instructions with varying execution times presents conflicts in the execution of a sequence of instructions. For example, a first instruction may generate data that is required by a second instruction. If the second instruction would normally require the data before the first instruction has generated the data, a conflict arises. Generally, a pipelined microprocessor must stall execution of the second instruction until the first instruction has generated the required data. Each clock cycle for which the execution of any instruction is stalled adds to the overall time required to execute a computer program.

SUMMARY OF THE INVENTION

The present invention comprises an apparatus for increasing the execution speed of a microprocessor that executes pipelined instructions wherein operations of multiple instructions are simultaneously executed and wherein the source of data for a current instruction may be the destination of data for a previous instruction. The apparatus includes a source/destination field comparator that compares a source field of a current instruction with a destination field of a previous instruction, where the data for the destination for the previous instruction has not yet been generated. The source/destination field comparator provides a first active output signal that indicates when the source field and the destination field are identical. The apparatus further includes an operation field comparator that compares a first operation field of the current instruction with a second operation field of the previous instruction. The operation field comparator provides a second active output signal when the first and second operation fields are compatible. The apparatus further includes an instruction combining circuit that is activated on concurrence of the first active output signal and the second active output signal to combine an operation performed by the microprocessor in response to the first operation field with an operation performed by the microprocessor in response to the second operation field so that the first and second operations occur during a same operational cycle of the microprocessor.

The present invention also comprises a method for increasing the execution speed of a processor having pipelined data execution wherein a current instruction may have a data source corresponding to a data destination of a previous instruction for which the data has not yet been provided. The method includes a step of comparing a source field of the current instruction with a destination field of the previous instruction to determine whether the source field and the destination field select a same data storage location. The method further includes a step of comparing a first operation field of the current instruction with a second operation field of the previous instruction to determine whether the first and second operation fields are compatible such that the first and second operation fields select respective first and second operations that can be performed at the same time on data. The method further includes a step involving either of two alternative steps. When the source field and the destination field select the same data storage location and the first and second operations are compatible, the method includes the step of performing the first and second operations on data during a same instruction cycle. On the other hand, when the source field and the destination field select the same data storage location and the first and second operations are not compatible, the method includes the step of stalling the current instruction until the data for the data destination of the previous instruction has been produced.

BRIEF DESCRIPTION OF THE DRAWINGS

FIGS. 2A and 2B form a more detailed functional block diagram of the register files and the operational unit of FIG. 1.

FIG. 7 is a more detailed functional block diagram of the flag register multiplexer and the flag register of FIG. 2B.

DETAILED DESCRIPTION OF THE PREFERRED EMBODIMENT

Figure 1:
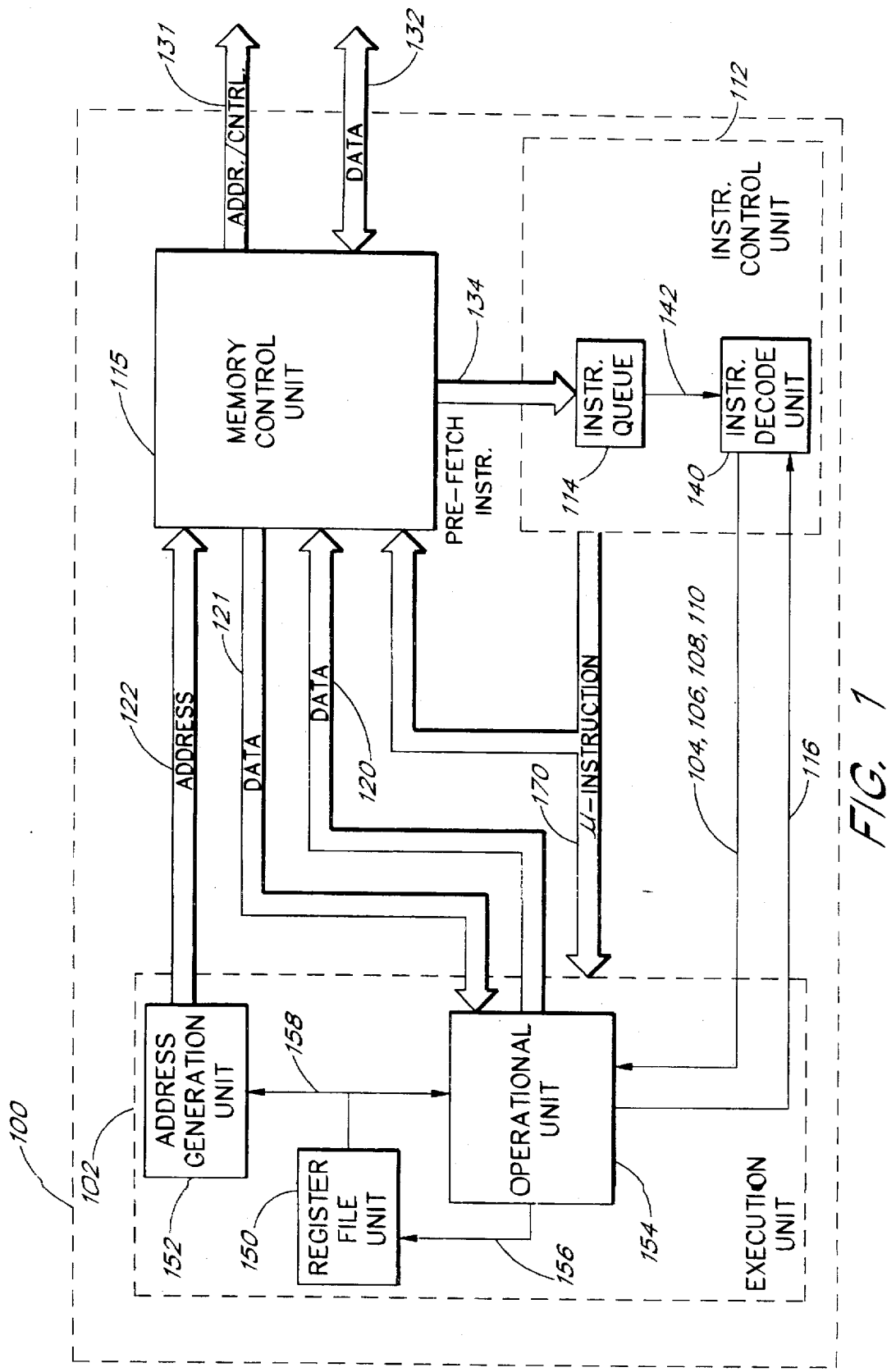
FIG. 1 is a high level functional block diagram of a microprocessor designed in accordance with the present invention.

FIG. 1 is a high-level functional block diagram of a microprocessor 100 that is used to illustrate the preferred embodiment of the present invention. However, the present invention can also be used with microprocessors having other architectures.

Referring to FIG. 1, the microprocessor 100 comprises an execution unit 102, an instruction control unit 112, and a memory control unit (MCU) 115. The execution unit 102 comprises a register file unit 150, an address generation unit 152, and an operational unit 154. The instruction control unit 112 comprises an instruction queue 114, a macro-instruction decode unit 140, and other functional units (not shown).

The address generation unit 152 of the execution unit 102 is connected to the MCU 115 by an effective address bus 122. The operational unit 154 of the execution unit 102 is connected to the MCU 115 by a first internal data bus 120 and a second internal data bus 121. The MCU 115 is connected to external devices (not shown) by an address/control bus 131 and a data bus 132. The MCU 115 is connected to the instruction queue 114 of the instruction control unit 112 by a pre-fetch instruction bus 134. The instruction queue 114 is connected to the decode unit 140 by an instruction bus 142. The decode unit 140 is connected to the operational unit 154 of the execution unit 102 by a cycle1 register specification bus 104, a cycle2 register specification bus 106, a cycle3 register specification bus 108, a decoded macro-instruction bus 110, and a stall decode line 116. The instruction control unit 112 is connected to the execution unit 102 and the MCU 115 by a micro-instruction bus 170. The operational unit 154 is connected to the register file unit 150 by a result interface 156. The register file unit 150 is connected to the address generation unit 152 and to the operational unit 154 by a register data interface 158.

Figure 2B:
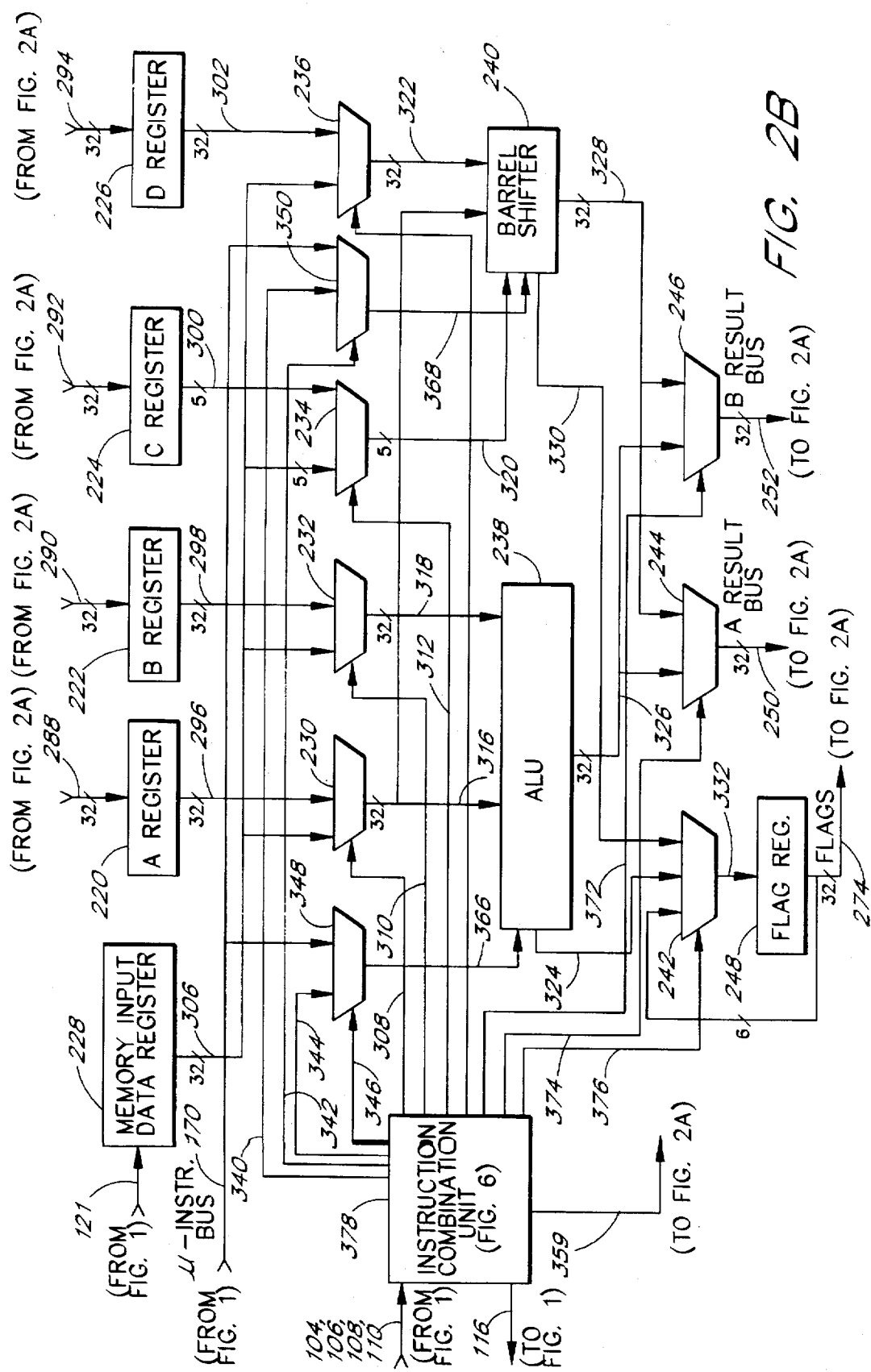

FIGS. 2A and 2B form a functional block diagram of the register file unit 150 and the operational unit 154 of FIG. 1. The register file unit 150 comprises an A result register 200, a B result register 202, a segment register file 204, a general purpose register file 206, and a temporary register file 208. The operational unit 154 comprises an A register multiplexer 210, a B register multiplexer 212, a C register multiplexer 214, a D register multiplexer 216, an operand source selector 218, an A register 220, a B register 222, a C register 224, a D register 226, a memory input data register (MIDR) 228, an A/MIDR multiplexer 230, a B/MIDR multiplexer 232, a C/MIDR multiplexer 234, a D/MIDR multiplexer 236, an ALU 238, a barrel shifter 240, a flag register multiplexer 242, an A result bus multiplexer 244, a B result bus multiplexer 246, a flag register 248, an ALU function multiplexer 348, a barrel shifter function multiplexer 350, and an instruction combination unit 378.

The result interface 156 (FIG. 1) comprises an A result bus 250 (FIG. 2A) and a B result bus 252 (FIG. 2A). The A result bus 250 is connected between the A result bus multiplexer 244 (FIG. 2B) and the A result register 200. The A result bus 250 is also connected to the A register multiplexer 210, the B register multiplexer 212, the C register multiplexer 214, and the D register multiplexer 216. The A result bus 250 also forms a part of the data bus 120 that is connected to the MCU 115. The B result bus 252 is connected between the B result bus multiplexer 246 (FIG. 2B) and the B result register 202. The B result bus 252 is also connected to the A register multiplexer 210, the B register multiplexer 212, the C register multiplexer 214, and the D register multiplexer 216. An A result register bus 254 is connected between the A result register 200, the segment register file 204 and the general purpose register file 206. A B result register bus 256 is connected between the B result register 202, the general purpose register file 206 and the temporary register file 208. The register data interface 158 comprises a segment register bus 258, a GP port A bus 260, a GP port B bus 262, a GP port C bus 264, a GP port D bus 266, a temporary register port B bus 268, and a temporary register port D bus 270. The segment register bus 258 is connected between the segment register file 204 and the A register multiplexer 210. The GP port A bus 260 is connected between the general purpose register file 206 and the A register multiplexer 210. The GP port B bus 262 is connected between the general purpose register file 206 and the B register multiplexer 212. The GP port C bus 264 is connected between the general purpose register file 206 and the C register multiplexer 214. The GP port D bus 266 is connected between the general purpose register file 206 and the D register multiplexer 216. The temporary register port B bus 268 is connected between the temporary register file 208 and the B register multiplexer 212. The temporary register port D bus 270 is connected between the temporary register file 208 and the D register multiplexer 216. An immediate data bus 272 is connected to the A register multiplexer 210, the B register multiplexer 212, the C register multiplexer 214, and the D register multiplexer 216. A flags bus 274 is connected between the flag register 248 (FIG. 2B) and the A register multiplexer 210. A logic one bus 276 is connected to the C register multiplexer 214. A logic zero bus 278 is connected to the C register multiplexer 214. The micro-instruction bus 170 (FIG. 1) is connected to the operand source selector 218. A register specification bus 359 is connected between the instruction combination unit 378 (FIG. 2B) and the operand source selector 218. A segment register control bus 360 is connected between the operand source selector 218 and the segment register file 204. A GP register control bus 362 is connected between the operand source selector 218 and the general purpose register file 206. A temporary register control bus 364 is connected between the operand source selector 218 and the temporary register file 208. An A register multiplexer control bus 280 is connected between the operand source selector 218 and the A register multiplexer 210. A B register multiplexer control bus 282 is connected between the operand source selector 218 and the B register multiplexer 212. A C register multiplexer control line 284 is connected between the operand source selector 218 and the C register multiplexer 214. A D register multiplexer control line 286 is connected between the operand source selector 218 and the D register multiplexer 216. An A register input bus 288 is connected between the A register multiplexer 210 and the A register 220 (FIG. 2B). A B register input bus 290 is connected between the B register multiplexer 212 and the B register 222 (FIG. 2B). A C register input bus 292 is connected between the C register multiplexer 214 and the C register 224 (FIG. 2B). A D register input bus 294 is connected between the D register multiplexer 216 and the D register 226 (FIG. 2B).

An A register output bus 296 is connected between the A register 220 and the A/MIDR multiplexer 230. A B register output bus 298 is connected between the B register 222 and the B/MIDR multiplexer 232. A C register output bus 300 is connected between the C register 224 and the C/MIDR multiplexer 234. A D register output bus 302 is connected between the D register 226 and the D/MIDR multiplexer 236. The second internal data bus 121 (FIG. 1) is connected to the MIDR 228. A memory register data bus 306 is connected between the MIDR 228, the A/MIDR multiplexer 230, the B/MIDR multiplexer 232, the C/MIDR multiplexer 234 and the D/MIDR multiplexer 236. An A/MIDR multiplexer control line 308 is connected between the instruction combination unit 378 and the A/MIDR multiplexer 230. A B/MIDR multiplexer control line 310 is connected between the instruction combination unit 378 and the B/MIDR multiplexer 232. A C/MIDR multiplexer control line 312 is connected between the instruction combination unit 378 and the C/MIDR multiplexer 234. A D/MIDR multiplexer control line 314 is connected between the instruction combination unit 378 and the D/MIDR multiplexer 236. An A/MIDR bus 316 is connected between the A/MIDR multiplexer 230, the ALU 238, and barrel shifter 240. A B/MIDR bus 318 is connected between the B/MIDR multiplexer 232 and the ALU 238. A C/MIDR bus 320 is connected between the C/MIDR multiplexer 234 and the barrel shifter 240. A D/MIDR bus 322 is connected between the D/MIDR multiplexer 236 and the barrel shifter 240. An ALU output bus 326 is connected between the ALU 238, the A result bus multiplexer 244, and the B result bus multiplexer 246. A barrel shifter output bus 328 is connected between the barrel shifter 240, the A result bus multiplexer 244 and the B result bus multiplexer 246. An ALU flag bus 324 is connected between the ALU 238 and the flag register multiplexer 242. A barrel shifter flag bus 330 is connected between the barrel shifter 240 and the flag register multiplexer 242. A flag register input bus 332 is connected between the flag register multiplexer 242 and the flag register 248. The flag bus 274 is connected between the flag register 248 and the flag register multiplexer 242. The micro instruction bus 170 (FIG. 1) is connected to the ALU function multiplexer 348 and the barrel shifter function multiplexer 350. The cycle1 register specification bus 104, the cycle2 register specification bus 106, the cycle3 register specification bus 108, the decoded macro instruction bus 110, and the stall decode line 116 are connected between the instruction decode unit 140 (FIG. 1) and the instruction combination unit 378. A substitute barrel shifter function bus 340 is connected between the instruction combination unit 378 and the barrel shifter function multiplexer 350. A barrel shifter function multiplexer control line 342 is connected between the instruction combination unit 378 and the barrel shifter function multiplexer 350. A substitute ALU function bus 344 is connected between the instruction combination unit 378 and the ALU function multiplexer 348. An ALU function multiplexer control line 346 is connected between the instruction combination unit 378 and the ALU function multiplexer 348. A B result bus multiplexer control line 372 is connected between the instruction combination unit 378 and the B result bus multiplexer 246. An A result bus multiplexer control line 374 is connected between the instruction combination unit 378 and the A result bus multiplexer 244. A twelve-bit flag register multiplexer control bus 376 is connected between the instruction combination unit 378 and the flag register multiplexer 242.

Figure 3:
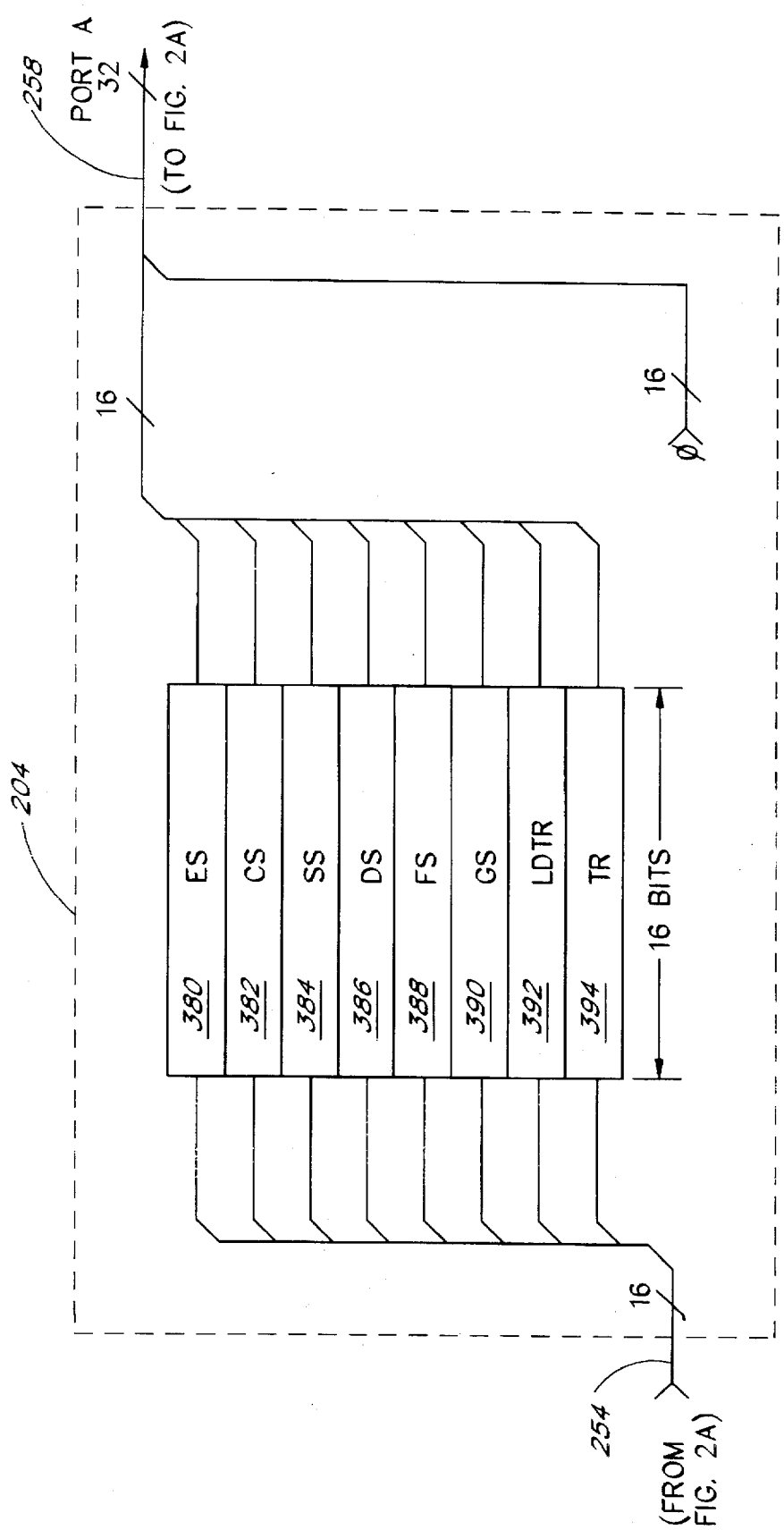
FIG. 3 is a more detailed functional block diagram of the segment register file of FIG. 2A.

FIG. 3 is a more detailed functional block diagram of the segment register file 204 of FIG. 2A. The segment register file 204 comprises an ES register 380, a CS register 382, an SS register 384, a DS register 386, an FS register 388, a GS register 390, a local descriptor table (LDTR) register 392 and a task (TR) register 394. The A result register bus 254 is connected between the A result register 200 (FIG. 2A), the ES register 380, the CS register 382, the SS register 384, the DS register 386, the FS register 388, the GS register 390, the LDTR register 392, and the TR register 394. The segment register bus 258 is connected between the ES register 380, the CS register 382, the SS register 384, the DS register 386, the FS register 388, the GS register 390, the LDTR register 392, the TR register 394, and the A register multiplexer 210 (FIG. 2A). The most significant 16 bits of the segment register bus 258 are connected to a logic zero.

Figure 4A:
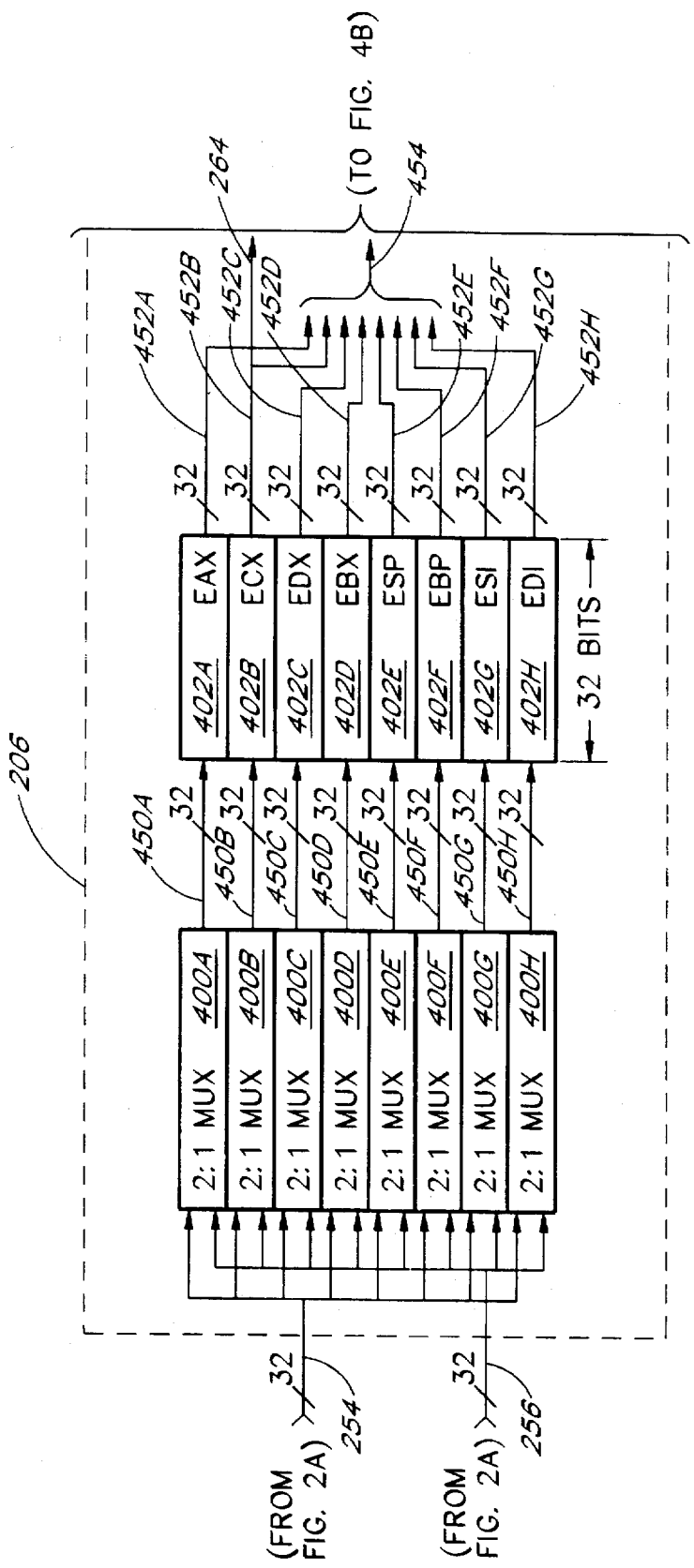
FIGS. 4A and 4B form a more detailed functional block diagram of the general purpose register file of FIG. 2A.
Figure 4B:
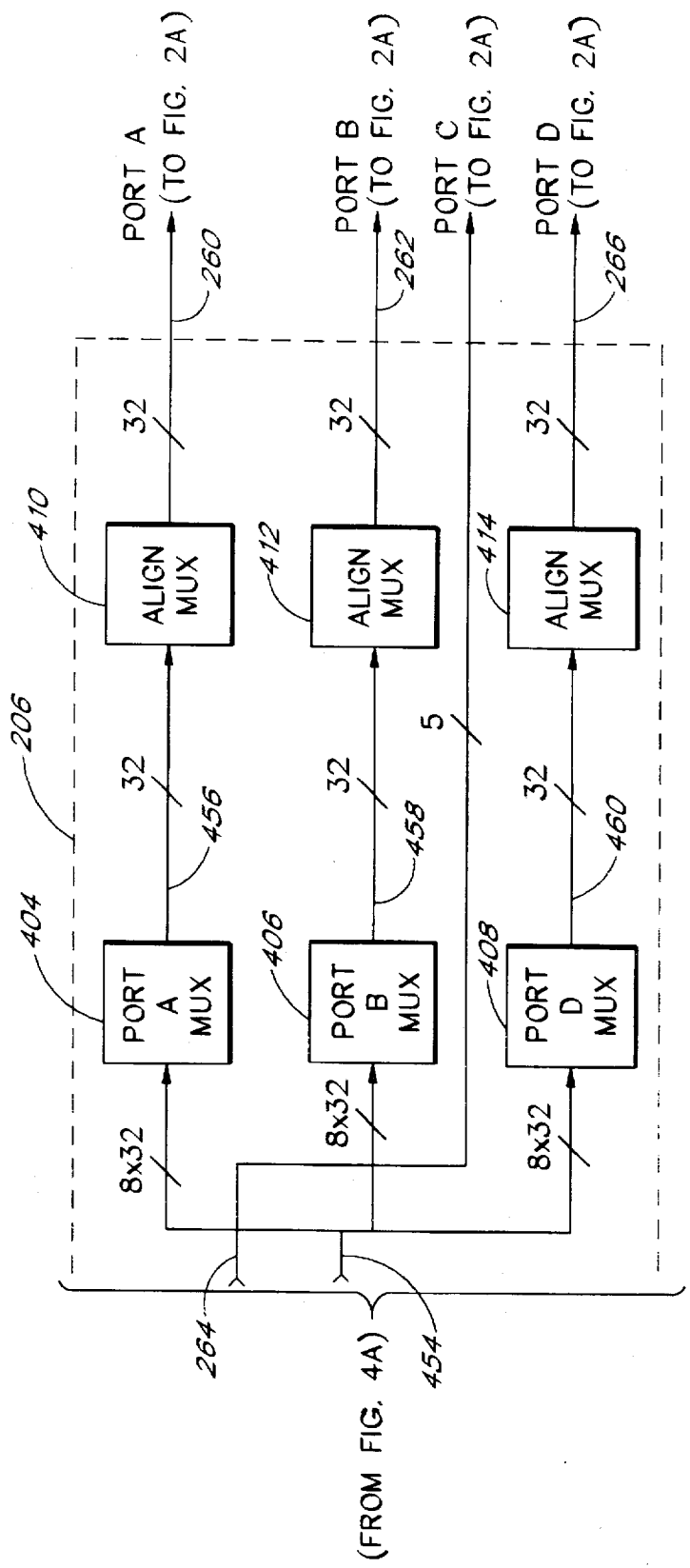

FIGS. 4A and 4B form a more detailed functional block diagram of the general purpose register file 206 of FIG. 2A. The general purpose register file 206 comprises a set of eight 2-to-1 multiplexers 400A, 400B, 400C, 400D, 400E, 400F, 400G, and 400H, an EAX register 402A, an ECX register 402B, an EDX register 402C, an EBX register 402D, an ESP register 402E, an EBP register 402F, an ESI register 402G, an EDI register 402H, a port A multiplexer 404, a port B multiplexer 406, a port D multiplexer 408, and a set of three alignment multiplexers 410, 412 and 414.

The A result register bus 254 is connected between the A result register 200 (FIG. 2A) and each of the eight 2-to-1 multiplexers 400A to 400H. The B result register bus 256 is connected between the B result register 202 (FIG. 2A) and each of the eight 2-to-1 multiplexers 400A to 400H. An EAX input bus 450A is connected between the 2-to-1 multiplexer 400A and the EAX register 402A. An ECX input bus 450B is connected between the 2-to-1 multiplexer 400B and the ECX register 402B. An EDX input bus 450C is connected between the 2-to-1 multiplexer 400C and the EDX register 402C. An EBX input bus 450D is connected between the 2-to-1 multiplexer 400D and the EBX register 402D. An ESP input bus 450E is connected between the 2-to-1 multiplexer 400E and the ESP register 402E. An EBP input bus 450F is connected between the 2-to-1 multiplexer 400F and the EBP register 402F. An ESI input bus 450G is connected between the 2-to-1 multiplexer 400G and the ESI register 402G. An EDI input bus 450H is connected between the 2-to-1 multiplexer 400H and the EDI register 402H. An EAX output bus 452A is connected between the EAX register 402A, the port A multiplexer 404, the port B multiplexer 406 and the port D multiplexer 408. An ECX output bus 452B is connected between the ECX register 402B, the port A multiplexer 404, the port B multiplexer 406 and the port D multiplexer 408. The five least significant bits of the ECX output bus 452B form the general purpose register port C bus 264 and are connected between the ECX register 402B and the C register multiplexer 214 (FIG. 2A). An EDX output bus 452C is connected between the EDX register 402C, the port A multiplexer 404, the port B multiplexer 406, and the port D multiplexer 408. An EBX output bus 452D is connected between the EBX register 402D, the port A multiplexer 404, the port B multiplexer 406 and the port D multiplexer 408. An ESP output bus 452E is connected between the ESP register 402E, the port A multiplexer 404, the port B multiplexer 406, and the port D multiplexer 408. An EBP output bus 452F is connected between the EBP register 402F, the port A multiplexer 404, the port B multiplexer 406 and the port D multiplexer 408. An ESI output bus 452G is connected between the ESI register 402G, the port A multiplexer 404, the port B multiplexer 406 and the port D multiplexer 408. An EDI output bus 452H is connected between the EDI register 402H, the port A multiplexer 404, the port B multiplexer 406, and the port D multiplexer 408. The EAX output bus 452A, the ECX output bus 452B, the EDX output bus 452C, the EBX output bus 452D, the ESP output bus 452E, the EBP output bus 452F, the ESI output bus 452G and the EDI output bus 452H combine to form the general purpose register bus 454. The general purpose register bus 454 is connected to the port A multiplexer 404, the port B multiplexer 406 and the port D multiplexer 408. A port A multiplexer bus 456 is connected between the port A multiplexer 404 and the alignment multiplexer 410. A port B multiplexer bus 458 is connected between the port B multiplexer 406 and the alignment multiplexer 412. A port D multiplexer bus 460 is connected between the port D multiplexer 408 and the alignment multiplexer 414. The GP port A bus 260 is connected between the alignment multiplexer 410 and the A register multiplexer 210 (FIG. 2A). The GP port B bus 262 is connected between the alignment multiplexer 412 and the B register multiplexer 212 (FIG. 2A). The GP port D bus 266 is connected between the alignment multiplexer 414 and the D register multiplexer 216 (FIG. 2A).

Figure 5:
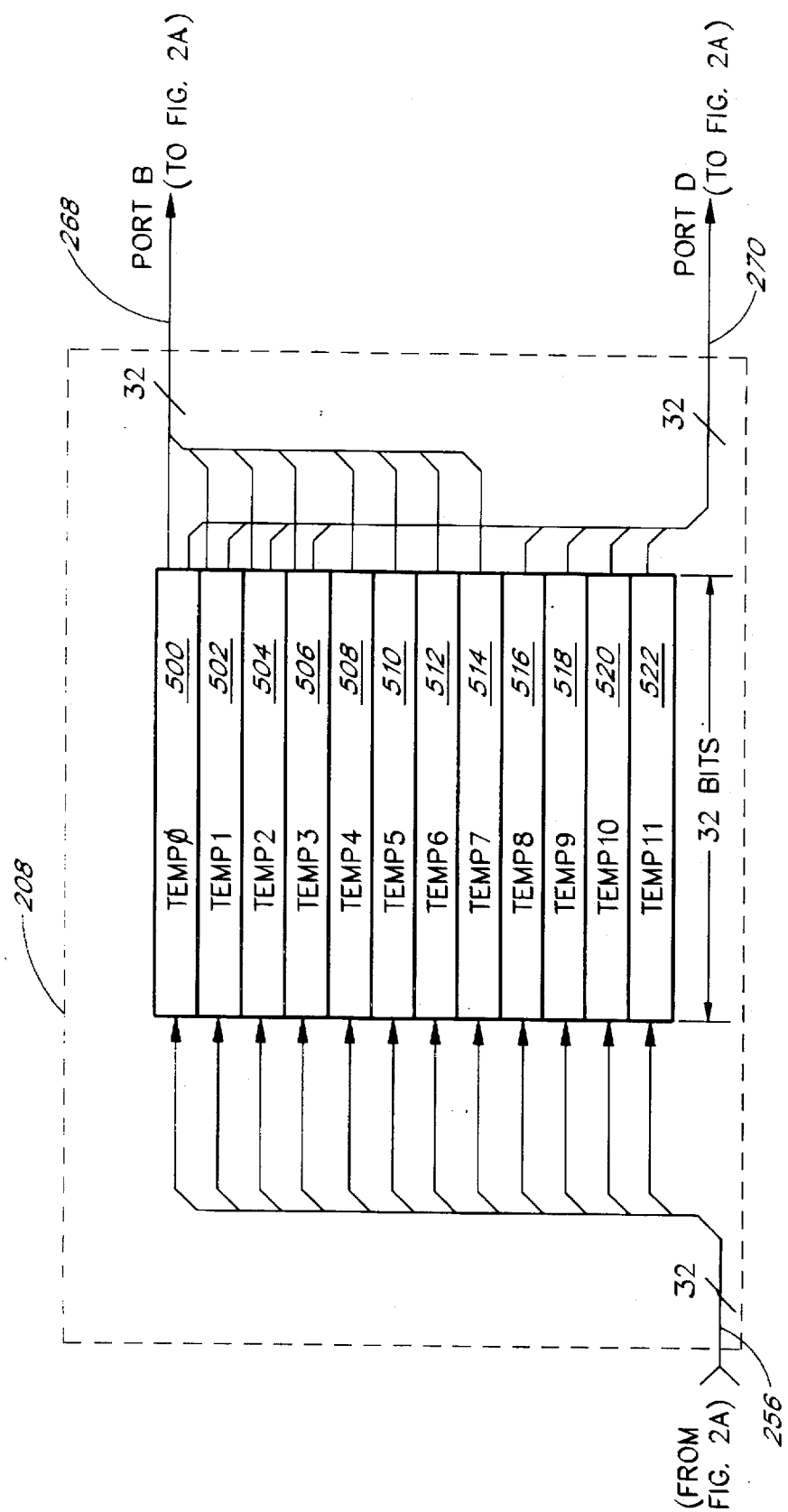
FIG. 5 is a more detailed functional block diagram of the temporary register file of FIG. 2A.

FIG. 5 is a more detailed functional block diagram of the temporary register file 208 of FIG. 2A. The temporary register file 208 comprises a tempo register 500, a temp1 register 502, a temp2 register 504, a temp3 register 506, a temp4 register 508, a temp5 register 510, a temp6 register 512, a temp7 register 514, a temp8 register 516, a temp9 register 518, a temp10 register 520 and a temp11 register 522. The B result register bus 256 is connected between the B result register 202 (FIG. 2A), the tempo register 500, the temp1 register 502, the temp2 register 504, the temp3 register 506, the temp4 register 508, the temp5 register 510, the temp6 register 512, the temp7 register 514, the temp8 register 516, the temp9 register 518, the temp10 register 520, and the temp11 register 522. The temporary register port B bus 268 is connected between the temp0 register 500, the temp1 register 502, the temp2 register 504, the temp3 register 506, the temp4 register 508, the temp5 register 510, the temp6 register 512, the temp7 register 514, and the B register multiplexer 212 (FIG. 2A). The temporary register port D bus 270 is connected between the tempo register 500, the temp1 register 502, the temp2 register 504, the temp3 register 506, the temp8 register 516, the temp9 register 518, the temp10 register 520, the temp11 register 522 and the D register multiplexer 216 (FIG. 2A).

Figure 6:
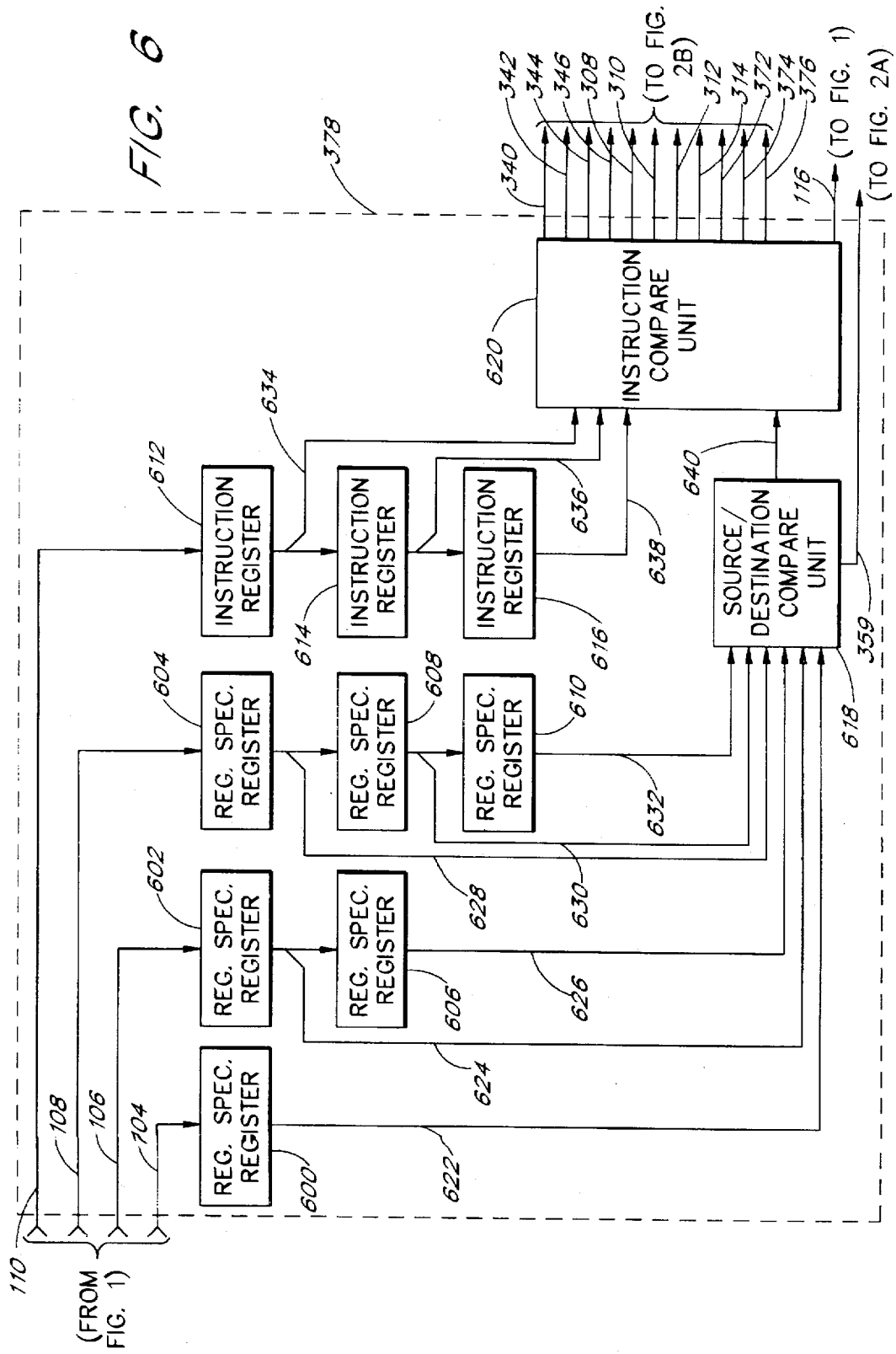
FIG. 6 is a more detailed functional block diagram of the instruction combination unit of FIG. 2B.

FIG. 6 is a more detailed functional block diagram of the instruction combination unit 378 of FIG. 2B. The instruction combination unit 378 of FIG. 2B. The specification register 600, a register specification register 602, a register specification register 604, a register specification register 606, a register specification register 608, a register specification register 610, an instruction register 612, an instruction register 614, an instruction register 616, a source/destination compare unit 618 and an instruction compare unit 620.

The cycle1 register specification bus 104 is connected between the instruction decode unit 140 (FIG. 1) and the register specification register 600. The cycle2 register specification bus 106 is connected between the instruction decode unit 140 (FIG. 1) and the register specification register 602. The cycle3 register specification bus 108 is connected between the instruction decode unit 140 (FIG. 1) and the register specification register 604. A cycle1 register specification bus 622 is connected between the register specification register 600 and the source/destination compare unit 618. A cycle2 register specification bus 624 is connected between the register specification register 602, the register specification register 606 and the source/destination compare unit 618. A cycle2 register specification bus 626 is connected between the register specification register 606 and the source/destination compare unit 618. A cycle3 register specification bus 628 is connected between the register specification register 604, the register specification register 608 and the source/destination compare unit 618. A cycle3 register specification bus 630 is connected between the register specification register 608, the register specification register 610, and the source/destination compare unit 618. A cycle3 register specification bus 632 is connected between the register specification register 610 and the source/destination compare unit 618. The decoded macro instruction bus 110 is connected between the instruction decode unit 140 (FIG. 1) and the instruction register 612. An instruction bus 634 is connected between the instruction register 612, the instruction register 614 and the instruction compare unit 620. An instruction bus 636 is connected between the instruction register 614, the instruction register 616 and the instruction compare unit 620. An instruction bus 638 is connected between the instruction register 616 and the instruction compare unit 620. A source/destination conflict bus 640 is connected between the source/destination compare unit 618 and the instruction compare unit 620. The register specification bus 359 is connected between the source/destination compare unit 618 and the operand source selector 218 (FIG. 2A). The substitute barrel shifter function bus 340 is connected between the instruction compare unit 620 and the barrel shifter function multiplexer 350 (FIG. 2B). The barrel shifter function multiplexer control line 342 is connected between the instruction compare unit 620 and the barrel shifter function multiplexer 350 (FIG. 2B). The substitute ALU function bus 344 is connected between the instruction compare unit 620 and the ALU function multiplexer 348 (FIG. 2B). The ALU function multiplexer control line 346 is connected between the instruction compare unit 620 and the ALU function multiplexer 348 (FIG. 2B). The A/MIDR multiplexer control line 308 is connected between the instruction compare unit 620 and the A/MIDR multiplexer 230 (FIG. 2B). The B/MIDR multiplexer control line 310 is connected between the instruction compare unit 620 and the B/MIDR multiplexer 232 (FIG. 2B). The C/MIDR multiplexer control line 312 is connected between the instruction compare unit 620 and the C/MIDR multiplexer 234 (FIG. 2B). The D/MIDR multiplexer control line 314 is connected between the instruction compare unit 620 and the D/MIDR multiplexer 236 (FIG. 2B). The B result bus multiplexer control line 372 is connected between the instruction compare unit 620 and the B result bus multiplexer 246 (FIG. 2B). The A result bus multiplexer control line 374 is connected between the instruction compare unit 620 and the A result bus multiplexer 244 (FIG. 2B). The flag register multiplexer control bus 376 is connected between the instruction compare unit 620 and the flag register multiplexer 242 (FIG. 2B). The stall decode line 116 is connected between the instruction compare unit 620 and the instruction decode unit 140 (FIG. 1).

FIG. 7 is a more detailed functional block diagram of the flag register multiplexer 242 and the flag register 248 of FIG. 2B. The flag register multiplexer 242 comprises a set of six individually controlled 3:1 multiplexers 242O, 242S, 242Z, 242A, 242P, and 242C. The flag register 248 comprises an overflow bit 248O, a sign bit 248S, a zero bit 248Z, an auxiliary carry bit 248A, a parity bit 248P, a carry bit 248C, and a number of system and control flag bits.

The ALU flag bus 324 comprises an overflow line 324O, a sign line 324S, a zero line 324Z, an auxiliary carry line 324A, a parity line 324P, and a carry line 324C. The overflow line 324O is connected to the 3:1 multiplexer 242O. The sign line 324S is connected to the 3:1 multiplexer 242S. The zero line 324Z is connected to the 3:1 multiplexer 242Z. The auxiliary carry line 324A is connected to the 3:1 multiplexer 242A. The parity line 324P is connected to the 3:1 multiplexer 242P. The carry line 324C is connected to the 3:1 multiplexer 242C. The barrel shifter flag bus 330 comprises an overflow line 330O, a sign line 330S, a zero line 330Z, an auxiliary carry line 330A, a parity line 330P, and a carry line 330C. The overflow line 330O is connected to the 3:1 multiplexer 242O. The sign line 330S is connected to the 3:1 multiplexer 242S. The zero line 330Z is connected to the 3:1 multiplexer 242Z. The auxiliary carry line 330A is connected to the 3:1 multiplexer 242A. The parity line 330P is connected to the 3:1 multiplexer 242P. The carry line 330C is connected to the 3:1 multiplexer 242C. The flag bus 274 comprises an overflow line 274O, a sign line 274S, a zero line 274Z, an auxiliary carry line 274A, a parity line 274P, and a carry line 274C. The flag bus 274 also comprises a set of 26 system/control flag lines. The overflow line 274O is connected between the overflow bit 248O and the 3:1 multiplexer 242O. The sign line 274S is connected between the sign bit 248S and the 3:1 multiplexer 242S. The zero line 274Z is connected between the zero bit 248Z and the 3:1 multiplexer 242Z. The auxiliary carry line 274A is connected between the auxiliary carry bit 248A and the 3:1 multiplexer 242A. The parity line 274P is connected between the parity bit 248P and the 3:1 multiplexer 242P. The carry line 274C is connected between the carry bit 248C and the 3:1 multiplexer 242C. The flag register multiplexer control bus 376 is connected to the flag register multiplexer 242 to control each of the 3:1 multiplexers 242O, 242S, 242Z, 242A, 242P, and 242C. The flag register input bus 332 comprises an overflow line 332O, a sign line 332S, a zero line 332Z, an auxiliary carry line 332A, a parity line 332P, and a carry line 332C. The overflow line 332O is connected between the 3:1 multiplexer 242O and the overflow bit 248O. The sign line 332S is connected between the 3:1 multiplexer 242S and the sign carry bit 248S. The zero line 332Z is connected between the 3:1 multiplexer 242Z and the zero bit 248Z. The auxiliary carry line 332A is connected between the 3:1 multiplexer 242A and the auxiliary carry bit 248A. The parity line 332P is connected between the 3:1 multiplexer 242P and the parity bit 248P. The carry line 332C is connected between the 3:1 multiplexer 242C and the carry bit 248C.

Referring again to FIG. 1, the microprocessor 100 generally executes computer programs that are stored in an external memory (not shown) connected to the address/ control bus 131 and the data bus 132. The MCU 115 fetches macro-instructions from the external memory using the address/control bus 131 and the data bus 132. The MCU 115 provides these macro-instructions to the instruction queue 114 over the instruction bus 134. The instruction queue 114 provides the macro-instructions to the decode unit 140, one at a time, over the instruction bus 142. As the MCU 115 pre-fetches macro-instructions from the external memory, the instructions are stored in the instruction queue 114 until the decode unit 140 is ready for them.

The decode unit 140 generates micro-instructions that are communicated to the micro-instruction bus 170. A micro-instruction ROM (not shown) provides additional micro-instructions to the micro-instruction bus 170. As is well known in the art, a micro-instruction comprises a number of fields that provide instruction data to different units within the microprocessor 100. As shown in FIG. 1, different fields of the micro-instruction are provided from the micro-instruction bus 170 to the execution unit 102 and the MCU 115.

The address generation unit 152 provides effective addresses to the MCU 115 over the address bus 122. Each effective address specifies a memory location for performing either an instruction fetch or an operand access. The MCU 115 converts the effective addresses into physical addresses. The MCU 115 uses the physical address to perform the requested memory access using the address/control bus 131, and the data bus 132. The MCU 115 may optionally include a cache (not shown). If the requested access is an operand read, the requested data is placed on the data bus 121. If the requested access is an instruction fetch, the MCU 115 returns the requested code data on the macro-instruction bus 134, and the code data is buffered by the instruction queue 114.

The operational unit 154 receives operand data from the MCU 115 over the internal data bus 121 and stores some of the data in the register file unit 150. The operational unit 154 performs program specified operations on other data received from the MCU 115, as well as data stored in the register file unit 150. The operational unit 154 stores some of the results of these operations in the register file unit 150 and provides some of the results to the MCU 115 over the data bus 120.

Referring to FIGS. 2A, 2B, 3, 4A, 4B, 5, and 7, when operand data is read from user memory, the MCU 115 places the data into the MIDR 228 using the data bus 121. During a memory LOAD instruction, the data from the MIDR 228 is generally passed through the barrel shifter 240 to the B result bus 252 and to the B result register 202. The flow of data from the MIDR 228 to the B result bus 202 is controlled by the multiplexers 234, 236, 350 and 246. The data is then transferred from the B result register 202 to a register in one of the register files 204, 206 or 208.

The data in the register files 204, 206 and 208 is generally used by the ALU 238 and the barrel shifter 240 to perform programmer specified operations. The ALU 238 operates on data received from the A/MIDR bus 316 and the B/MIDR bus 318. A data path is provided between the register files 204 and 206 and the A/MIDR bus 316. This data path comprises the segment register bus 258, the GP port A bus 260, the A register multiplexer 210, the A register input bus 288, the A register 220, and the A/MIDR multiplexer 230. Similarly, a data path is provided between the register files 206 and 208 and the B/MIDR bus 318. This data path comprises the temporary register port B bus 268, the GP port B bus 262, the B register multiplexer 212, the B register input bus 290, the B register 222, and the B/MIDR multiplexer 232. Thus, data from the register files 204, 206 and 208 is channeled into the A register 220 and the B register 222, so that the ALU 238 can operate on the data. This data channeling is performed by controlling access to the register files 204, 206 and 208, by controlling the multiplexers 210 and 212, and by controlling the loading of the A register 220 and the B register 222. The type of operation performed by the ALU 238 is controlled by the ALU function bus 366. For example, the ALU 238 may add the data on the A/MIDR bus 316 to the data on the B/MIDR bus 318 and generate the sum on the ALU output bus 326. Also, the barrel shifter 240 generally performs various operations on data received from the C/MIDR bus 320 and the D/MIDR bus 322. A data path is provided between the register file 206 and the C/MIDR bus 320. This data path comprises the GP port C bus 264, the C register multiplexer 214, the C register input bus 292, the C register 224, and the C/MIDR multiplexer 234. Similarly, a data path is provided between the register files 206 and 208 and the D/MIDR bus 322. This data path comprises the temporary register port D bus 270, the GP port D bus 266, the D register multiplexer 216, the D register input bus 294, the D register 226, and the D/MIDR multiplexer 236. Thus, data from the register files 206 and 208 is channeled into the C register 224 and the D register 226, so that the barrel shifter 240 can operate on the data. This data channeling is performed by controlling access to the register files 206 and 208, by controlling the multiplexers 214 and 216, and by controlling the loading of the C register 224 and the D register 226. The type of operation performed is controlled by the barrel shifter function bus 368. For example, the barrel shifter 240 may shift the data on the D/MIDR bus 322 by an amount indicated by the C/MIDR bus 320, and generate the result on the barrel shifter output bus 328. The barrel shifter 240 may also operate on the A/MIDR bus 316.

The result bus multiplexers 244 and 246 direct the results of the ALU and barrel shifter operations to the appropriate result buses 250 and 252. The output from the ALU 238 is typically directed to the A result register 200 via the A result bus 250, while the output from the barrel shifter 240 is typically directed to the B result register 202 via the B result bus 252. The results of the ALU and barrel shifter operations are either loaded back into the register files 204, 206 and 208 from the result registers 200 and 202, or they are written to user memory by transferring the data to the MCU 115 over the data bus 120.

The loading of the A result register 200 and the B result register 202 are controlled by the operand source selector 218. The A result register 200 generates output data on the A result register bus 254. The B result register 202 generates output data on the B result register bus 256.

Each of the segment registers 380, 382, 384, 386, 388, 390, 392 and 394 of the segment register file 204 receive the data on the A result register bus 254. Each of the registers 380, 382, 384, 386, 388, 390, 392, and 394 can also drive the least significant word of the segment register bus 258. Using the segment register control bus 360, the operand source selector 218 controls the loading of input data and the generating of output data for each of the registers 380, 382, 384, 386, 388, 390, 392, and 394. Only one of the registers 380, 382, 384, 386, 388, 390, 392, and 394 is enabled to drive the segment register bus 258 at any given time.

The operand source selector 218 also controls the operation of the general purpose register file 206 by the GP register control bus 362. Specifically, the GP register control bus 362 controls each of the multiplexers 400A to 400H independently to select either the A result register bus 254 or the B result register bus 256. The GP register control bus 362 also controls each of the general purpose registers 402A to 402H to load the value at the respective input bus 450A to 450H. Thus, each of the registers 402A to 402H can be independently loaded from either the A result register bus 254 or the B result register bus 256. In addition, the GP register control bus 362 controls each of the port multiplexers 404, 406 and 408 independently to select one of the registers 402A to 402H to drive the respective output ports. Each of the general purpose registers 402A to 402H continuously generates data on the respective output buses 452A to 452H. Finally, the GP register control bus 362 controls each of the alignment multiplexers 410, 412 and 414 to adjust the alignment of the respective data values, as required by specific operations, such as byte register accesses.

Each of the temporary registers 500, 502, 504, 506, 508, 510, 512, 514, 516, 518, 520 and 522 of the temporary register file 208 receives the data on the B result register bus 256. Each of the registers 500, 502, 504, 506, 508, 510, 512, and 514 can drive the temporary register port B bus 268, while each of the registers 500, 502, 504, 506, 516, 518, 520 and 522 can drive the temporary register port D bus 270. Using the temporary register control bus 364, the operand source selector 218 controls the loading of input data and the generating of output data for each of the registers 500, 502, 504, 506, 508, 510, 512, 514, 516, 518, 520 and 522. Only one of the registers 500, 502, 504, 506, 508, 510, 512, and 514 is enabled to drive the temporary register port B bus 268 at any given time, while only one of the registers 500, 502, 504, 506, 516, 518, 520 and 522 is enabled to drive the temporary register port D bus 270 at any given time.

Each of the register files 204, 206 and 208 is implemented with a write through capability. This capability allows data that is being written into a register to be read out of the register during the same clock cycle. This capability provides a register file read/write hit function. This function may eliminate a stall cycle in the execution of a subsequent instruction that follows a preceding instruction, where the subsequent instruction requires data that is to be written into a register by the preceding instruction. Specifically, if the subsequent instruction is ready for the data during the same clock cycle that the data is being written into the register by the preceding instruction, the register file read/write hit function allows the data to be immediately available to the subsequent instruction at the register bus 258, 260, 262, 264, 266, 268 or 270. Without the register file read/write hit function, the execution of the subsequent instruction would be stalled for one clock cycle, until the data can be read out of the register.

The operand source selector 218 controls the A register multiplexer 210 using the A register multiplexer control bus 280 to select a source for the A register 220. Potential sources include the flags bus 274, the immediate data bus 272, the A result bus 250, the B result bus 252, the segment register bus 258 and the GP port A bus 260. The operand source selector 218 also controls the A register 220 to load data from the A register input bus 288 at appropriate times.

The operand source selector 218 controls the B register multiplexer 212 using the B register multiplexer control bus 282 to select a source for the B register 222. Potential sources include the immediate data bus 272, the A result bus 250, the B result bus 252, the temporary register port B bus 268 and the GP port B bus 262. The operand source selector 218 also controls the B register 222 to load data from the B register input bus 290 at appropriate times.

The operand source selector 218 controls the C register multiplexer 214 using the C register multiplexer control bus 284 to select a source for the C register 224. Potential sources include the logic zero bus 278, the logic one bus 276, the immediate data bus 272, the A result bus 250, the B result bus 252, and the GP port C bus 264. The operand source selector 218 also controls the C register 224 to load data from the C register input bus 292 at appropriate times. The data inputs and the data output of the C register multiplexer 214 are five bit buses because the output of the C register 224 provides control signals to the shift count input of the barrel shifter 240, which preferably receives only five bits of control signals.

The operand source selector 218 controls the D register multiplexer 216 using the D register multiplexer control bus 286 to select a source for the D register 226. Potential sources include the immediate data bus 272, the A result bus 250, the B result bus 252, the temporary register port D bus 270 and the GP port D bus 266. The operand source selector 218 also controls the D register 226 to load data from the D register input bus 294 at appropriate times.

The data on the A result bus 250 and on the B result bus 252 can be directly loaded into any of the registers 220, 222, 224 and 226 by appropriate control of the multiplexers 210, 212, 214, and 216. This capability provides a result bus look-ahead function. Similar to the register file read/write hit function, this function may eliminate a stall cycle in the execution of a subsequent instruction that follows a preceding instruction, where the subsequent instruction requires data that is to be written into a register by the preceding instruction. Specifically, if the subsequent instruction is ready for the data during the same clock cycle that the data is being written into either of the result registers 200 or 202 by the preceding instruction, the result bus look-ahead function allows the data to be immediately available to the subsequent instruction at the register input bus 288, 290, 292 or 294. Without the result bus look-ahead function, the execution of the subsequent instruction would be stalled for one clock cycle, until the data can be read out of the result register 200 or 202, using the register file read/write hit function.

The operand source selector 218 monitors the microinstruction bus 170 and the register specification bus 359 to determine the appropriate signals for controlling the above-described circuits to implement the programming instructions.

The instruction combination unit 378 controls the A/MIDR multiplexer 230 using the A/MIDR multiplexer control line 308 to select data from either the MIDR 228 or the A register 220. The selected data is applied to the A/MIDR bus 316. The instruction combination unit 378 controls the B/MIDR multiplexer 232 using the B/MIDR multiplexer control line 310 to select data from either the MIDR 228 or the B register 222. The selected data is applied to the B/MIDR bus 318. The instruction combination unit 378 controls the C/MIDR multiplexer 234 using the C/MIDR multiplexer control line 312 to select data from either the MIDR 228 or the C register 224. The selected data is applied to the C/MIDR bus 320. Again, the data inputs and the data output of the C/MIDR multiplexer 234 comprise only five bit values because the shift count input of the barrel shifter 240 only accepts five bits. The instruction combination unit 378 controls the D/MIDR multiplexer 236 using the D/MIDR multiplexer control line 314 to select data from either the MIDR 228 or the D register 226. The selected data is applied to the D/MIDR bus 322.

The instruction combination unit 378 controls the ALU function multiplexer 348 using the ALU function multiplexer control line 346 to select an ALU function from either the micro-instruction bus 170 or from the instruction combination unit 378. The instruction combination unit 378 controls the barrel shifter function multiplexer 350 using the barrel shifter function multiplexer control line 342 to select a barrel shifter function from either the micro-instruction bus 170 or from the instruction combination unit 378. Generally, the instruction combination unit 378 selects the functions from the micro-instruction bus 170, unless the execution of multiple instructions is combined, as described in greater detail below.

The ALU 238 executes any one of a number of different operations as controlled by the ALU function bus 366. The operations are performed on the data from the A/MIDR bus 316 and the B/MIDR bus 318. The result of the operation is generated on the ALU output bus 326. The ALU 238 also generates a set of flag data on the ALU flag bus 324, according to the result of each operation.

The barrel shifter 240 executes any one of a number of different operations as controlled by the barrel shifter function bus 368. The operations are performed on the data from either the A/MIDR bus 316 or the D/MIDR bus 322. The C/MIDR bus 320 indicates the number of bits for the operation, for example a six bit shift. The result of the operation is generated on the barrel shifter output bus 328. The barrel shifter 240 also generates a set of flag data on the barrel shifter flag bus 330, according to the result of each operation.

The instruction combination unit 378 controls the A result bus multiplexer 244 using the A result bus multiplexer control line 374 to select data from either the ALU 238 or the barrel shifter 240. The selected data is applied to the A result bus 250 for loading into the A result register 200. The instruction combination unit 378 controls the B result bus multiplexer 246 using the B result bus multiplexer control line 372 to select data from either the ALU 238 or the barrel shifter 240. The selected data is applied to the B result bus 252 for loading into the B result register 202.

The flag register 248 comprises a set of six status flag bits 248O, 248S, 248Z, 248A, 248P and 248C. All of the status flag bits 248O, 248S, 248Z, 248A, 248P and 248C are controlled together to either load the data values on the flag register input bus 332 or to not load any new data values. Thus, when the flag register 248 is controlled to load new status bits, the data on the overflow line 332O is loaded into the overflow bit 248O, the data on the sign line 332S is loaded into the sign bit 248S, the data on the zero line 332Z is loaded into the zero bit 248Z, the data on the auxiliary carry line 332A is loaded into the auxiliary carry bit 248A, the data on the parity line 332P is loaded into the parity bit 248P, and the data on the carry line 332C is loaded into the carry bit 248C. The instruction combination unit 378 controls each of the 3:1 multiplexers 242O, 242S, 242A, 242P and 242C individually, using the flag register multiplexer control bus 376, to select status flag data from the ALU 238, the barrel shifter 240 and the flag register 248 for loading into the status bits 248O, 248S, 248Z, 248A, 248P and 248C. Thus, the 3:1 multiplexer 242O selects between the overflow line 274O from the flag register 248, the overflow line 324O from the ALU 238, and the overflow line 330O from the barrel shifter 240; the 3:1 multiplexer 242S selects between the sign line 274S from the flag register 248, the sign line 324S from the ALU 238, and the sign line 330S from the barrel shifter 240; the 3:1 multiplexer 242Z selects between the zero line 274Z from the flag register 248, the zero line 324Z from the ALU 238, and the zero line 330Z from the barrel shifter 240; the 3:1 multiplexer 242A selects between the auxiliary carry line 274A from the flag register 248, the auxiliary carry line 324A from the ALU 238, and the auxiliary carry line 330A from the barrel shifter 240; the 3:1 multiplexer 242P selects between the parity line 274P from the flag register 248, the parity line 324P from the ALU 238, and the parity line 330P from the barrel shifter 240; and the 3:1 multiplexer 242C selects between the carry line 274C from the flag register 248, the carry line 324C from the ALU 238, and the carry line 330C from the barrel shifter 240. The selected data for each 3:1 multiplexer 242O, 242S, 242Z, 242A, 242P, and 242C is applied to the corresponding status line 332O, 332S, 332Z, 332A, 332P, and 332C of the flag register input bus 332 for loading into the corresponding status bit 248O, 248S, 248Z, 248A, 248P, and 248C of the flag register 248. The instruction combination unit 378 also controls the flag register 248 to load data from the flag register input bus 332 at the appropriate times.

Different programming instructions may affect different status bits in the flag register 248. For example, an ADD instruction may affect all six status bits 248O, 248S, 248Z, 248A, 248P and 248C, while a SHIFT instruction may only affect the four status bits 248S, 248Z, 248P and 248C. Thus, when an ADD instruction is executed at the ALU 238, each of the 3:1 multiplexers 242O, 242S, 242Z, 242A, 242P, and 242C generally selects status data generated by the ALU 238. On the other hand, when a SHIFT instruction is executed at the barrel shifter 240, each of the 3:1 multiplexers 242S, 242Z, 242P, and 242C generally selects status data generated by the barrel shifter 240, while each of the 3:1 multiplexers 242O and 242A generally selects the status data from the flag register 248, leaving the overflow bit 248O and the auxiliary carry bit 248A unchanged after the shift operation.

To illustrate the operation of the circuitry of FIGS. 2A, 2B, 3, 4A, 4B and 5, the general execution of a single macro-instruction is described. Assume the following generic macro-instruction is executed by the microprocessor 100, without any prior or subsequent instructions:

LOAD EAX, mem(DS+displacement)

This instruction requires that a value stored in memory be loaded into the general purpose register EAX 402A. The address location of the value in memory that is to be loaded is determined by adding the displacement to the memory address referenced by the DS register 386. This instruction does not affect any of the status bits 2480, 248S, 248Z, 248A, 248P, or 248C of the flag register 248. The execution of this instruction is illustrated in Table 1 below.

In Tables 1, 2, 3, 5, 6, 7, 8, 9, 10, and 11, the character sequence "<-" indicates that data is loaded from a source on the right side of the character sequence to a destination on the left side of the character sequence. Thus, "B RES<- MIDR" indicates that data is loaded from the MIDR register 228 into the B result register 202. The source on the right side of the character sequence may also include an operation. For example, "A RES<-MIDR +B" indicates that the contents of the MIDR register 228 are added to the contents of the B register 222 and the sum is loaded into the A result register 200. In the expression "F<-OSZAPC-F", the first "F" indicates that the flag register 248 is loaded, and the expression "OSZAPC-F" indicates the source for the load. Specifically, the second "F" indicates that the source is the flag register 248, and the characters "OSZAPC" indicate that each of the status bits 2480, 248S, 248Z, 248A, 248P and 248C is loaded from the specified source. Thus, the expression "F<-OSZAPC-F" indicates that the status bits 2480, 248S, 248Z, 248A, 248P and 248C are loaded back into the flag register 248. In the expression "F<-OSZAPC-A", the source is the ALU 238. In the expression "F<-OSZAPC-B", the source is the barrel shifter 240. In addition, multiple sources can be specified for a single load of the flag register 248. Thus, the expression "F<-SZPC-B,OA-F" indicates that the status bits 248S, 248Z, 248P, and 248C are loaded with status data generated by the barrel shifter 240, while the status bits 2480 and 248A are loaded with values from the flag register 248. The expression "D>>C" indicates that the contents of the D register 226 are shifted right by an amount represented by the contents of the C register 224.

During a first microprocessor clock cycle that is not shown in Table 1 (cycle 0), the instruction is fetched from the instruction queue 114 into the instruction decode unit 140 using the instruction bus 142. Based on the decoded instruction, the instruction control unit 112 generates appropriate data signals on the micro-instruction bus 170, the register specification buses 104, 106 and 108, and the decoded macro-instruction bus 110.

During a second microprocessor clock cycle, cycle 1, the contents of the DS register 386 are loaded into a segment register (not shown) of the address generation unit 152 for calculating the appropriate memory address. During a cycle 2, the desired address is transferred to the MCU 115 over the address bus 122. During a cycle 3, the desired address is applied to a cache memory. If the desired address is present inside the cache memory, the contents of the memory location are loaded into the MIDR 228. If there is no cache hit, then execution of the instruction is stalled until the desired memory data is retrieved from external memory. The description below assumes cache hits on every load from memory.

During a cycle 4, the data from the MIDR 228 is passed through the barrel shifter 240 and loaded into the B result register 202. Specifically, the instruction combination unit 378 controls the D/MIDR multiplexer 236 to apply the contents of the MIDR 228 to a data input of the barrel shifter 240. The instruction combination unit 378 also controls the shifter function multiplexer 350 to apply the shift function from the micro-instruction bus 170 to the shift function input of the barrel shifter 240. The shift function supplied by the micro-instruction bus 170 causes the data on the D/MIDR bus 322 to pass straight through the barrel shifter 240, without any modification. Thus, the memory data from the MIDR 228 passes through to the barrel shifter output bus 328. The instruction combination unit 378 also controls the B result bus multiplexer 246 to select the output from the barrel shifter 240 for loading into the B result register 202.

Also during the cycle 4, the instruction combination unit 378 controls the flag register multiplexer 242 using the flag register multiplexer control bus 376 to select appropriate flag data for the flag register 248. In this example, each of the 3:1 multiplexers 2420, 242S, 242Z, 242A, 242P and 242C is controlled to select the data from the flag register 248 because the LOAD instruction, which does not affect any of the status bits 2480, 248S, 248Z, 248A, 248P, and 248C, is executed during the cycle 4 by the barrel shifter 240. The instruction combination unit 378 also controls the flag register 248 to load the selected data values.

During a cycle 5, the EAX register 402A loads the value from the B result register bus 256. Specifically, the operand source selector 218 causes the 2-to-1 multiplexer 400A to apply the signals on the B result register bus 256 to the EAX input bus 450A. Also, the operand source selector 218 causes the EAX register 402A to load the corresponding value. Thus, after the cycle 5, execution of the instruction is complete, and the contents of the addressed memory location have been transferred to the EAX register 402A.

To illustrate pipelined execution of macro-instructions in the microprocessor 100, the general execution of a pair of pipelined macro-instructions is described. Assume the following generic macro-instructions are executed by the microprocessor 100:

LOAD EAX, mem(DS+displacement)
ADD EDX, EDX, EBX

The LOAD instruction is the same as described above. The ADD instruction requires that the contents of the EDX register 402C be added to the contents of the EBX register 402D, and that the result be stored in the EDX register 402C. The ADD instruction affects the status bits 2480, 248S, 248Z, 248A, 248P, and 248C. The execution of this sequence of instructions is illustrated in Table 2 below.

During a cycle 0 (not shown), the LOAD instruction is fetched from the instruction queue 114, as described above. During a cycle 1, for the LOAD instruction, the contents of the DS register 386 are loaded into a segment register (not shown) for calculating the appropriate memory address, as described above. Also during the cycle 1, the ADD instruction is fetched from the instruction queue 114, as described above with reference to the LOAD instruction.

During a cycle 2, for the LOAD instruction, the desired address is transferred to the MCU 115 over the address bus 122, as described above. Also during the cycle 2, for the ADD instruction, the contents of the EDX register 402C are loaded into the A register 220, and the contents of the EBX register 402D are loaded into the B register 222. Thus, the general purpose register file 206 is controlled to output the contents of the EDX register 402C onto the GP port A bus 260 and to output the contents of the EBX register 402D onto the GP port B bus 262. The A register multiplexer 210 is controlled to select the GP port A bus 260, while the B register multiplexer 212 is controlled to select the GP port B bus 262. The A register 220 and the B register 222 are controlled to load their respective input values.

During a cycle 3, for the LOAD instruction, the desired address is applied to a cache memory and the contents of the memory location are loaded into the MIDR 228, as described above. Also during the cycle 3, for the ADD instruction, the ALU 238 adds the contents of the A register 220 to the contents of the B register 222. This sum is stored in the A result register 200. Thus, the A/MIDR multiplexer 230 is controlled to select the A register 220, while the B/MIDR multiplexer 232 is controlled to select the B register 222. Also, the ALU function multiplexer 348 is controlled to select the ALU function provided by the micro-instruction bus 170. This function is the add function. Finally, the A result bus multiplexer 244 is controlled to select the ALU output bus 326, and the A result register 200 is controlled to load its input value.

Also during the cycle 3, the instruction combination unit 378 controls the flag register multiplexer 242 using the flag register multiplexer control bus 376 to select appropriate flag data for the flag register 248. In this example, each of the 3:1 multiplexers 242O, 242S, 242Z, 242A, 242P and 242C is controlled to select the status flags generated by the ALU 238 because the ADD instruction, which affects all six status bits 248O, 248S, 248Z, 248A, 248P, and 248C, is executed during the cycle 3 by the ALU 238. The instruction combination unit 378 also controls the flag register 248 to load the selected flag values.

During a cycle 4, for the LOAD instruction, the data from the MIDR 228 is passed through the barrel shifter 240 and loaded into the B result register 202, as described above. Also during the cycle 4, for the ADD instruction, the EDX register 402C loads the value from the A result register bus 254. Specifically, the operand source selector 218 causes the 2-to-1 multiplexer 400C to apply the signals on the A result register bus 254 to the EDX input bus 450C. Also, the operand source selector 218 causes the EDX register 402C to load the corresponding value. Thus, after the cycle 4, execution of the ADD instruction is complete, and the sum of (1) the contents of the EDX register 402C and (2) the contents of the EBX register 402D has been loaded into the EDX register 402C.

Also during the cycle 4, the instruction combination unit 378 controls the flag register multiplexer 242 using the flag register multiplexer control bus 376 to select appropriate flag data for the flag register 248. In this example, each of the 3:1 multiplexers 242O, 242S, 242Z, 242A, 242P and 242C is controlled to select the status flags from the flag register 248 because the LOAD instruction, which does not affect any of the status bits 248O, 248S, 248Z, 248A, 248P, and 248C, is executed during the cycle 4 by the barrel shifter 240. The instruction combination unit 378 also controls the flag register 248 to load the selected flag values. Note that, although the barrel shifter 240 generates flag data on the barrel shifter flag bus 330, this data is not loaded into the flag register 248, so that the flag register 248 retains the flag data that resulted from the ADD instruction. This is the desired result because the ADD instruction is intended to be executed after the LOAD instruction.

During a cycle 5, for the LOAD instruction, the EAX register 402A loads the value from the B result register bus as described above, and the LOAD instruction is complete.

The above examples are relatively simple because they do not contain any execution conflicts. Execution conflicts may comprise resource conflicts or data access conflicts. A resource conflict involves two instructions that attempt to use a single resource, such as the ALU 238, during the same cycle. A data access conflict may, for example, involve a subsequent instruction that operates on the result of a preceding instruction, where the result of the preceding instruction is not yet available when the subsequent instruction is otherwise ready for execution. This is an operand data conflict. As another example of a data access conflict, a flag register update conflict generally occurs when a later-fetched instruction could access the flag register 248 before, or during the same clock cycle as, an earlier-fetched instruction, and both instructions access at least one common status bit. If there is no mechanism to account for a flag update conflict, either the flag update from the earlier-fetched instruction would overwrite the flag update from the later-fetched instruction, the later-fetched instruction would read status data that has not yet been updated by the earlier-fetched instruction, or the earlier-fetched instruction would read status data that has already been updated by the later-fetched instruction. Clearly, none of these results can be allowed to occur. The following description considers the effect of specific data access conflicts on the pipelined execution of multiple instructions.

Generally, computer programs are written for sequential execution, so that the results of preceding instructions are used in subsequent operations. Thus, from a programming perspective, the LOAD instruction in the example of Table 2 should be performed before the ADD instruction. However, as described above, the ADD instruction actually completes execution before the LOAD instruction. In some circumstances, this execution of instructions in an order that is different from the order of fetching the instructions can give rise to data access conflicts.

Referring to the example of Table 3, an operand data conflict is introduced. In this example, the ADD instruction requires that the sum of the EAX register 402A and the EDX register 402C be loaded into the EAX register 402A. If the instructions of this example were executed in the manner described above relative to Table 2, the EAX register 402A would be read during the cycle 2 for the ADD instruction. However, the result from the LOAD instruction is not written into the EAX register 402A until cycle 5. Thus, in this hypothetical situation, the ADD instruction would not operate on the data loaded from memory by the LOAD instruction, as intended by the programmer.

With a basic pipeline design, resolving this operand data access conflict would require that the execution of the ADD instruction be stalled for four clock cycles, so that the memory data could be retrieved from the EAX register 402A before it is used for the ADD instruction. Thus, the memory data would be retrieved during the cycle 6, the sum would be calculated in the cycle 7, and the sum would be loaded into the EAX register 402A in the cycle 8. With the above-described register file read/write hit function, the memory data can be accessed, for the ADD instruction, through the EAX register 402A during the same clock cycle that the EAX register 402A is loaded, by the LOAD instruction. As a result, execution can be resumed a cycle earlier, so that the memory data would be retrieved during the cycle 5, the sum would be calculated in the cycle 6, and the sum would be loaded into the EAX register 402A in the cycle 7. With the above-described result bus look ahead function, the memory data can be accessed during the same clock cycle that the data is loaded into the A result register 200, by the LOAD instruction. As a result, execution can be resumed still one clock earlier, so that the memory data would be retrieved during the cycle 4, the sum would be calculated in the cycle 5, and the sum would be loaded into the EAX register 402A in the cycle 6. As described below, the instruction combination aspects of the present invention allow the ADD instruction to be executed even earlier, so that the memory data is available during the cycle 3, the sum is calculated in the cycle 4, and the sum is loaded into the EAX register 402A in the cycle 5.

The instruction combination aspects of the present invention are explained with reference to the instruction combination unit 620 of FIG. 6 to facilitate a better understanding of the concepts involved. Generally, the source/destination compare unit 618 detects data access conflicts and the instruction compare unit 620 resolves the conflicts by combining multiple instructions for simultaneous execution, or by stalling the execution of one or more instructions.

When the instruction control unit 140 decodes a macro-instruction, it generates a number of signals that are communicated to the instruction combination unit 378 over the register specification buses 104, 106 and 108 and over the decoded macro-instruction bus 110. The register specification buses 104, 106 and 108 provide information related to register file accesses for the segment register file 204, the general purpose register file 206 and the temporary register file 208, as well as accesses to the flag register 248. The information conveyed by each register specification bus 104, 106 or 108 comprises the following data values:

| Data Value | Description |
| --- | --- |
| ALU Destination | Register to receive ALU output |
| Barrel Shifter Dest. | Reg. to receive Barrel Shifter output |
| Flag Update | Status Bits Accessed |
| A Register Source | Register to be loaded into A reg. 220 |
| B Register Source | Register to be loaded into B reg. 222 |
| C Register Source | Register to be loaded into C reg. 224 |
| D Register Source | Register to be loaded into D reg. 226 |
| R1 | Macro-Instruction Register Field R1 |
| R2 | Macro-Instruction Register Field R2 |
| RM | Macro-Instruction Register Field RM |

Each register specification bus 104, 106 or 108 pertains to a different clock cycle in the execution of the macro-instruction. The following discussion assumes that a macro-instruction is fetched from the instruction queue 114 during a clock cycle 0 and that the next five clock cycles are cycle 1, cycle 2, cycle 3, cycle 4 and cycle 5, respectively. The cycle1 register specification bus 104 pertains to the cycle 1, the cycle2 register specification bus 106 pertains to the cycle 2, and the cycle3 register specification bus 108 pertains to the cycle 3. The instruction decode unit 140 assumes that the macro-instruction will execute without any stalls in determining the appropriate values for the respective register specification buses 104, 106 and 108.

In the following description, the word "registers" refers to registers in the register files 204, 206 and 208. The cycle1 register specification bus 104 indicates from which registers and from which status bits of the flag register 248 data is to be read during cycle 1, as well as indicating the registers and the status bits to which data is to be written and for which the data will be available during cycle 2. The data to be written into the registers is available at either the A result bus 250 or the B result bus 252. The cycle2 register specification bus 106 indicates from which registers and from which status bits data is to be read during cycle 2, as well as indicating the registers and the status bits to which data is to be written and for which the data will be available during cycle 3. The cycle3 register specification bus 108 indicates from which registers and from which status bits data is to be read during cycle 3, as well as indicating the registers and the status bits to which data is to be written and for which the data will be available during cycle 4.

Now, assume that the microprocessor 100 is to execute a sequence of three instructions, instruction1, instruction2 and instruction3, without any stalls. The decode of instruction1 occurs at an absolute clock cycle 0, the decode of instruction2 occurs at an absolute clock cycle 1, and the decode of instruction3 occurs at an absolute clock cycle 2. Clock cycles are also considered relative to the decoding of each instruction, with the decoding of a specific instruction defined as relative cycle 0. For example, a clock cycle 1 relative to the decoding of the instruction1 corresponds to the absolute clock cycle 1, a clock cycle 2 relative to the decoding of the instruction1 corresponds to the absolute clock cycle 2, and a clock cycle 3 relative to the decoding of the instruction1 corresponds to the absolute clock cycle 3. Also, a clock cycle 1 relative to the decoding of the instruction2 corresponds to the absolute clock cycle 2, a clock cycle 2 relative to the decoding of the instruction2 corresponds to the absolute clock cycle 3, and a clock cycle 3 relative to the decoding of the instruction2 corresponds to the absolute clock cycle 4. Also, a clock cycle 1 relative to the decoding of the instruction3 corresponds to the absolute clock cycle 3, a clock cycle 2 relative to the decoding of the instruction3 corresponds to the absolute clock cycle 4, and a clock cycle 3 relative to the decoding of the instruction3 corresponds to the absolute clock cycle 5.

During the decode cycle (relative cycle 0) of each instruction, the register specification register 600 is loaded with data that indicates (1) which registers are to be accessed during relative cycle 1, (2) which registers are to be loaded and for which the data is to be available at either the A result bus 250 or the B result bus 252 during relative cycle 2, (3) which status bits are to be read during relative cycle 1, and (4) which status bits are to be written during relative cycle 2. The data indicating which registers are to be accessed during relative cycle 1 is referred to as "cycle 1 source data." The data indicating which registers are to be loaded and for which the data is to be available at either the A result bus 250 or the B result bus 252 during cycle 2 is referred to as "cycle 2 destination data." The data indicating which status bits are to be read during cycle 1 is referred to as "cycle 1 status read data." The data indicating which status bits are to be written during cycle 2 is referred to as "cycle 2 status write data." Thus, during relative cycle 0 of each instruction, the register specification register 600 is loaded with cycle 1 source data, cycle 2 destination data, cycle 1 status read data and cycle 2 status write data, the register specification register 602 is loaded with cycle 2 source data, cycle 3 destination data, cycle 2 status read data and cycle 3 status write data, the register specification register 604 is loaded with cycle 3 source data, cycle 4 destination data, cycle 3 status read data and cycle 4 status write data. Also during relative cycle 0 of each instruction, the instruction register 612 is loaded with data indicating the instruction to be executed.

During absolute cycle 0, for the instruction1, the register 600 is loaded with relative cycle 1 source data and status read data and relative cycle 2 destination data and status write data, which corresponds to absolute cycle 1 source data and status read data and absolute cycle 2 destination data and status write data. Also during absolute cycle 0, for the instruction1, the register 602 is loaded with relative cycle 2 source data and status read data and relative cycle 3 destination data and status write data, which corresponds to absolute cycle 2 source data and status read data and absolute cycle 3 destination data and status write data. Also during absolute cycle 0, for the instruction1, the register 604 is loaded with relative cycle 3 source data and status read data and relative cycle 4 destination data and status write data, which corresponds to absolute cycle 3 source data and status read data and absolute cycle 4 destination data and status write data. Also during absolute cycle 0, the instruction register 612 is loaded with data indicating that the instruction1 is to be executed.

During absolute cycle 1, the absolute cycle 2 source data and status read data and the absolute cycle 3 destination data and status write data for instruction1 is transferred from the register 602 to the register 606, and the absolute cycle 3 source data and status read data and the absolute cycle 4 destination data and status write data for instruction1 is transferred from the register 604 to the register 608. Also during absolute cycle 1, for the instruction2, the register 600 is loaded with relative cycle 1 source data and status read data and relative cycle 2 destination data and status write data, which corresponds to absolute cycle 2 source data and status read data and absolute cycle 3 destination data and status write data. Here, the absolute cycle 2 source data and status read data and the absolute cycle 3 destination data and status write data for instruction1 is overwritten by data for instruction2. When register specification data for one instruction is overwritten by register specification data for a subsequent instruction, the source/destination compare unit 618 and the instruction compare unit 620 retain portions of the overwritten data, as required. Data may also be retained by the source/destination compare unit 618 and the instruction compare unit 620 when a register specification register 600, 602, 604, 606, 608 or 610 is cleared and the contents of the cleared register have not been loaded into a different register specification register 600, 602, 604, 606, 608 or 610. Data from the instruction registers 612, 614 and 616 may also be retained in similar situations. Also during absolute cycle 1, for the instruction2, the register 602 is loaded with relative cycle 2 source data and status read data and relative cycle 3 destination data and status write data, which corresponds to absolute cycle 3 source data and status read data and absolute cycle 4 destination data and status write data. Also during absolute cycle 1, for the instruction2, the register 604 is loaded with relative cycle 3 source data and status read data and relative cycle 4 destination data and status write data, which corresponds to absolute cycle 4 source data and status read data and absolute cycle 5 destination data and status write data. Also during absolute cycle 1, the instruction1 data is transferred from the instruction register 612 to the instruction register 614, and the instruction register 612 is loaded with data indicating that the instruction2 is to be executed.

During absolute cycle 2, the absolute cycle 3 source data and status read data and the absolute cycle 4 destination data and status write data for instruction1 is transferred from the register 608 to the register 610. Also during absolute cycle 2, the absolute cycle 3 source data and status read data and the absolute cycle 4 destination data and status write data for instruction2 is transferred from the register 602 to the register 606, and the absolute cycle 4 source data and status read data and the absolute cycle 5 destination data and status write data for instruction2 is transferred from the register 604 to the register 608. Also during absolute cycle 2, for the instruction3, the register 600 is loaded with relative cycle 1 source data and status read data and relative cycle 2 destination data and status write data, which corresponds to absolute cycle 3 source data and status read data and absolute cycle 4 destination data and status write data. Also during absolute cycle 2, for the instruction3, the register 602 is loaded with relative cycle 2 source data and status read data and relative cycle 3 destination data and status write data, which corresponds to absolute cycle 4 source data and status read data and absolute cycle 5 destination data and status write data. Also during absolute cycle 2, for the instruction3, the register 604 is loaded with relative cycle 3 source data and status read data and relative cycle 4 destination data and status write data, which corresponds to absolute cycle 5 source data and status read data and absolute cycle 6 destination data and status write data. Also during absolute cycle 2, the instruction1 data is transferred from the instruction register 614 to the instruction register 616, the instruction2 data is transferred from the instruction register 612 to the instruction register 614, and the instruction register 612 is loaded with data indicating that the instruction3 is to be executed. The data content of the registers 600, 602, 604, 606, 608, 610, 612, 614, and 616 after absolute cycle 2 is illustrated in Table 4 below. In Table 4, the references to specific cycle numbers refer to absolute cycle numbers.

During each cycle, the source/destination compare unit 618 performs a number of comparisons to determine whether specific operand data conflicts have arisen. Generally, the source/destination compare unit 618 compares the source data from various register specification registers against the destination data of various register specification registers. Specifically, the source data from the register 600 is compared against the destination data from the registers 606, 608 and 610. There is no need to compare between different register specification registers that correspond to the same instruction register, because these register specification registers are loaded in a manner that ensures that no conflicts are created in these registers. Also, the source data from the register 602 is compared against the destination data from the register 608, and the source data from the register 606 is compared against the destination data from the register 610. If the specification of the same register is detected in both the source data and the destination data of any of these comparisons, a conflict is detected. The outcome of each of these comparisons is communicated to the instruction compare unit 620 over the source/destination conflict bus 640. If a conflict is detected in the comparison between the registers 600 and 608, the instruction3 is stalled for at least one cycle. If a conflict is detected in any of the other comparisons, the instruction compare unit 620 determines whether a stall is necessary. The source/destination compare unit 618 also generates compare result data, as well as source and destination data to the operand source selector 218 over the register specification bus 359.

If there is no conflict detected, the instruction compare unit 620 controls the function multiplexer control lines 342 and 346 to select the functions from the micro-instruction bus 170, it controls the MIDR multiplexer control lines 308, 310, 312 and 314 as required by the instructions being executed, it controls the multiplexer control lines 372 and 374 and the multiplexer control bus 376 as required by the instructions being executed, and it indicates on the stall decode line 116 that the instruction decode unit 140 should not stall decoding further instructions. Also, the data from the registers 602, 604, 612, 608 and 614 are transferred to the registers 606, 608, 614, 610 and 616, respectively, and the registers 600, 602, 604 and 612 are loaded with data for a new instruction.

If there is an operand data conflict between the registers 600 and 608, a stall of the instruction3 is initiated. Specifically, the instruction compare unit 620 generates a signal on the stall decode line 116 indicating that the instruction decode unit 140 should stall the decoding of further instructions, at least for the next cycle. As described in greater detail below, upon receiving a stall signal on the stall decode line 116, the instruction decode unit 140 generates data on the register specification buses 104, 106 and 108 and on the decoded instruction bus 110 related to the next instruction for which data has not yet been loaded into the registers 600, 602, 604 and 612. Then, the instruction decode unit 140 stops decoding instructions until the stall signal on the stall decode line 116 is deactivated. Also, the instruction compare unit 620 controls the multiplexer control lines 342, 346, 308, 310, 312, 314, 372, and 374 and the multiplexer control bus 376, as described in the previous paragraph. Also, the contents of the registers 608 and 614 are loaded into the registers 610 and 616, respectively, the registers 606, 608 and 614 are cleared, and the registers 600, 602, 604 and 612 generally remain unchanged.

If there is a conflict between the registers 602 and 608, the instruction compare unit 620 compares the registers 612 and 614 to determine whether execution of the instruction3 can be combined with the execution of the instruction2. This is dependent on the particular architecture of the microprocessor in which the present invention is incorporated and on the particular format of the instructions involved. In the preferred embodiment, execution of the instructions can be combined if instruction2 is a load from memory and instruction3 uses either the ALU 238 or the barrel shifter 240. If the instructions can be combined, the instruction compare unit 620 operates in the same manner as described above for the situation in which no conflict was detected. If the instructions cannot be combined, the instruction compare unit 620 operates to stall the execution of the instruction3.

If there is a conflict between the registers 600 and 606, the instruction compare unit 620 compares the instruction3 from the register 612 against the instruction2 from the register 614 to determine whether the instructions can be combined. If there is a conflict between the registers 600 and 610, the instruction compare unit 620 compares the instruction3 from the register 612 against the instruction1 from the register 616 to determine whether the instructions can be combined. If the instructions, in either case, cannot be combined, the instruction compare unit 620 initiates a stall of the instruction. If the instructions, in either case, can be combined, the instruction compare unit 620 controls the function buses 340 and 344 and the multiplexer control lines 342, 346, 308, 310, 312, 314, 372, and 374 and the multiplexer control bus 376 to implement the combination of the two instructions. The instruction compare unit 620 also indicates on the stall decode line 116 that the instruction decode unit 140 should proceed with the decoding of the subsequent instruction.

If there is a conflict between the registers 606 and 610, instruction2 and instruction1 must be capable of being combined. Otherwise, the comparison between the registers 602 and 608 in the previous cycle would have resulted in the instruction2 being stalled, and the present comparison would have never occurred. Here, the instruction compare unit 620 controls the function buses 340 and 344 and the multiplexer control lines 342, 346, 308, 310, 312, 314, 372, and 374 and the multiplexer control bus 376 to implement the combination of instruction2 and instruction1. The instruction compare unit 620 also indicates that the instruction decode unit 140 should proceed with the decoding of the subsequent instruction.

If there are multiple conflicts during a single clock cycle, an appropriate instruction is stalled if any of the comparisons results in a stall condition.

Referring again to the example of Table 2, the instruction decode unit 140 generates data related to the LOAD instruction on the register specification buses 104, 106 and 108, and the decoded macro-instruction bus 110 during the cycle 0. The data on the cycle1 bus 104 indicates that the DS register 386 is to be accessed during cycle 1. Also, the data on the cycle3 bus 108 indicates that the data to be loaded into the EAX register 402A is to be available on the B result bus 252 during the cycle 4. The data on the cycle3 bus 108 also indicates that the status result data is to be available during the cycle 4, but that none of the status bits 248O, 248S, 248Z, 248A, 248P, and 248C are affected. During cycle 0, the data from the cycle1 bus 104 is loaded into the register specification register 600, the data from the cycle2 bus 106 is loaded into the register specification register 602, the data from the cycle3 bus 108 is loaded into the register specification register 608, and the data from the decoded instruction bus 110 is loaded into the instruction register 612. The data in the instruction register 612 indicates that a LOAD instruction is to be executed.

During the cycle 1, the data from the register specification registers 602 and 604 is loaded into the respective register specification registers 606 and 608, and the data in the instruction register 612 is loaded into the instruction register 614. Also during the cycle 1, the instruction decode unit 140 generates data related to the ADD instruction on the register specification buses 104, 106, and 108, and on the decoded instruction bus 110. The data on the register specification bus 104 indicates that the EDX register 402C and the EBX register 402D are to be accessed during the cycle 2, and that the data that is to be loaded into the EDX register 402C is to be available on the A result bus 250 during a cycle 3. The data on the register specification bus 104 indicates that each of the status bits 248O, 248S, 248Z, 248A, 248P, and 248C is to be written during the cycle 3. The data on the decoded instruction bus 110 indicates that an ADD instruction is to be executed. The data from the register specification buses 104, 106 and 108 is loaded into the respective register specification registers 600, 602 and 604, and the data from the instruction bus 110 is loaded into the instruction register 612, as described above.

At this point, the source/destination compare unit 618 does not detect any operand data conflicts because there are no registers in the source data of the ADD instruction that are common to the destination data of the LOAD instruction.

During a cycle 2, the data from the register specification registers 602, 604 and 608 is loaded into the respective register specification registers 606, 608 and 610, the data from the instruction registers 612 and 614 is loaded into the respective instruction registers 614 and 616, and the register specification registers 600, 602 and 604 and the instruction register 612 are cleared. Now the data in the register specification register 610 indicates that the data to be loaded into the EAX register 402A is to be available at the B result bus 252 during the cycle 4. Again, no operand data conflict is detected.

During a cycle 3, the data from the register specification register 608 is loaded into the register specification register 610, the data from the instruction register 614 is loaded into the instruction register 616, and the register specification registers 606 and 608 and the instruction register 614 are cleared. Again, there is no operand data conflict.

During a cycle 4, the register specification register 610 and the instruction register 616 are cleared. Both instructions are executed in a minimum number of clock cycles because there are no conflicts.

Referring again to the example of Table 3, the general execution of a second pair of pipelined macro-instructions is described. Assume the following generic macro-instructions are executed by the microprocessor 100:

LOAD EAX, mem(DS+displacement)
ADD EAX, EAX, EDX

The LOAD instruction is the same as described above. The ADD instruction requires that the contents of the EAX register 402A be added to the contents of the EDX register 402C, and that the result be stored in the EAX register 402A. The execution of this sequence of instructions is illustrated in Table 3 below.

During a cycle 0 (not shown), the LOAD instruction is fetched from the instruction queue 114, as described above. Also, the data from the register specification buses 104, 106 and 108 is loaded into the register specification registers 600, 602 and 604, and the data from the instruction bus 110 is loaded into the instruction register 612, as described above.

During a cycle 1, for the LOAD instruction, the contents of the DS register 386 are loaded into a segment register (not shown) for calculating the appropriate memory address, as described above. Also during the cycle 1, the ADD instruction is fetched from the instruction queue 114, as described above with reference to the previous ADD instruction. Also, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the data to be loaded into the EAX register 402A is to be available during the cycle 4, and the data in the register specification register 600 indicates that the EAX register 402A and the EDX register 402C are to be read during cycle 2 and that the data to be loaded into the EAX register 402A is to be available during the cycle 3. Here, the source/destination compare unit 618 detects an operand data conflict between the register specification registers 608 and 600. Specifically, the register specification register 600 indicates that the EAX register 402A is to be read for the ADD instruction before the result of the LOAD instruction, which is to be loaded into the EAX register 402A, is available. Under these circumstances, the microprocessor 100 must stall the execution of the ADD instruction.

During a cycle 2, for the LOAD instruction, the desired address is transferred to the MCU 115 over the address bus 122, as described above. Also during the cycle 2, for the ADD instruction, the contents of the EAX register 402A are loaded into the A register 220, and the contents of the EDX register 402C are loaded into the B register 222, as described above. However, the data from the EAX register 402A is old because the LOAD instruction has not yet loaded the new data from memory. As described above, the source/destination compare unit 618 detects an operand data conflict and the instruction compare unit 620 stalls execution of the ADD instruction. Therefore, the data loaded from the EAX register 402A is not used. Also, the data from the register specification register 608 is loaded into the register specification register 610, the data from the instruction register 614 is loaded into the instruction register 616, and the register specification register 608 and the instruction register 614 are cleared. The contents of the register specification registers 600, 602 and 604 and the instruction register 612 are not changed because the ADD instruction has been stalled for a cycle. Now the data in the register specification register 610 indicates that the data to be loaded into the EAX register 402A is to be available during cycle 4, and the data in the register specification register 600 indicates that the EAX register 402A and the EDX register 402C are to be read during cycle 3 and that the data to be loaded into the EAX register 402A is to be available during the cycle 4. Here, the source/destination compare unit 618 detects an operand data conflict between the register specification registers 610 and 600. Specifically, the EAX register 402A is to be read for the ADD instruction before the result of the LOAD instruction, which is to be loaded into the EAX register 402A, is generally available. Under these circumstances, previous microprocessor designs would stall the execution of the ADD instruction. Here, the source/destination compare unit 618 indicates to the instruction compare unit 620 that there is an operand data conflict between the register specification registers 610 and 600. The instruction compare unit 620 compares the data in the instruction registers 612 and 616 to determine whether the instructions can be combined. The LOAD instruction and the ADD instruction involved here can be combined using the ALU 238. As a result, there is no further stall of the ADD instruction, and the instruction compare unit 620 effectuates the combination of the instructions, as described below.

During a cycle 3, for the LOAD instruction, the desired address is applied to a cache memory and the contents of the memory location are loaded into the MIDR 228, as described above. Also during the cycle 3, for the ADD instruction, the contents of the EAX register 402A are again loaded into the A register 220, and the contents of the EDX register 402C are again loaded into the B register 222, as described above. The data from the EAX register 402A is still old because the LOAD instruction still has not yet completed. The instruction combination unit 620 ensures that the old data is not used. Also, the data from the register specification registers 602 and 604 is loaded into the respective register specification registers 606 and 608, the data from the instruction register 612 is loaded into the instruction register 614, and the register specification registers 600, 602, 604 and 610 and the instruction registers 612 and 616 are cleared.

During a cycle 4, for the combination of the LOAD instruction and the ADD instruction, the ALU 238 adds the contents of the MIDR 228 to the contents of the B register 222. This sum is stored in the A result register 200. Thus, the A/MIDR multiplexer 230 is controlled to select the MIDR register 228, while the B/MIDR multiplexer 232 is controlled to select the B register 222. Also, the ALU function multiplexer 348 is controlled to select the ALU function provided by the substitute ALU function bus 344. This function is the add function. Finally, the A result bus multiplexer 244 is controlled to select the ALU output bus 326, and the A result register 200 is controlled to load its input value. The load of the A result register 200 is controlled by the operand source selector 218 based on data received from the instruction combination unit 378 over the register specification bus 359. Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, each of the 3:1 multiplexers 242O, 242S, 242Z, 242A, 242P and 242C is controlled to select the data generated by the ALU 238 because the combination of the LOAD instruction and the ADD instruction is executed during the cycle 4 by the ALU 238, and because the ADD instruction affects all six status bits 248O, 248S, 248Z, 248A, 248P, and 248C. The LOAD instruction has no effect on any of the status bits 248O, 248S, 248Z, 248A, 248P, and 248C. The instruction combination unit 378 also controls the flag register 248 to load the selected data values.

During a cycle 5, for the combination of the LOAD instruction and the ADD instruction, the EAX register 402A loads the value from the A result register bus 254. Specifically, the operand source selector 218 causes the 2- to -1 multiplexer 400A to apply the signals on the A result register bus 254 to the EAX input bus 450A. Also, the operand source selector 218 causes the EAX register 402A to load the corresponding value. Again, the operand source selector 218 is responsive to data on the register specification bus 359. Also, the register specification register 610 and the instruction register 616 are cleared. After the cycle 5, execution of both the LOAD instruction and the ADD instruction is complete, and the sum of (1) the contents of the addressed memory location from the LOAD instruction and (2) the contents of the EDX register 402C has been loaded into the EAX register 402A.

Under the circumstances described above, the present invention combines the LOAD instruction with the ADD instruction for simultaneous execution. Without this instruction combination, the ADD instruction would have been stalled for one additional clock cycle, until the data from the LOAD instruction is available at the B result bus 252. Of course, this additional stall cycle also would have delayed the execution of all subsequent instructions by one clock cycle.

As another example of the instruction combination aspects of the present invention, the general execution of a sequence of three pipelined macro-instructions is described. Assume the following generic macro-instructions are executed by the microprocessor 100:

LOAD EAX, mem(DS+displacement)
ADD EDX, EDX, EBX
INC EAX, 1

The LOAD instruction is the same as described above. The ADD instruction requires that the contents of the EDX register 402C be added to the contents of the EBX register 402D, and that the result be stored in the EDX register 402C. The INC instruction requires that the contents of the EAX register 402A be incremented by one and stored back into the EAX register 402A. The INC instruction writes to the status bits 248O, 248S, 248Z, 248A, and 248P. The execution of this sequence of instructions is illustrated in Table 5 below.

During a cycle 0 (not shown), the LOAD instruction is fetched from the instruction queue 114, as described above. Also, the data from the register specification buses 104, 106 and 108 is loaded into the register specification registers 600, 602 and 604, and the data from the instruction bus 110 is loaded into the instruction register 612, as described above.

During a cycle 1, for the LOAD instruction, the contents of the DS register 386 are loaded into a segment register (not shown) for calculating the appropriate memory address, as described above. Also during the cycle 1, the ADD instruction is fetched from the instruction queue 114, as described above with reference to the previous ADD instructions. Also, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the data to be loaded into the EAX register 402A is to be available during the cycle 4, and the data in the register specification register 600 indicates that the EDX register 402C and the EBX register 402D are to be read during cycle 2 and that the data to be loaded into the EDX register 402C is to be available during the cycle 3. Here, the source/destination compare unit 618 detects no operand data conflicts.

During a cycle 2, for the LOAD instruction, the desired address is transferred to the MCU 115 over the address bus 122, as described above. Also during the cycle 2, for the ADD instruction, the contents of the EDX register 402C are loaded into the A register 220, and the contents of the EBX register 402D are loaded into the B register 222, as described above. Also during the cycle 2, the INC instruction is fetched from the instruction queue 114, as described above with reference to the LOAD and ADD instructions. The data from the register specification registers 602, 604, and 608 is loaded into the respective register specification registers 606, 608 and 610, the data from the register specification buses 104, 106 and 108 are loaded into the respective register specification registers 600, 602 and 604, the data from the instruction registers 612 and 614 are loaded into the respective instruction registers 614 and 616, and the data from the instruction bus 110 is loaded into the instruction register 612. Now the data in the register specification register 610 indicates that the data to be loaded into the EAX register 402A is to be available during cycle 4, and the data in the register specification register 600 indicates that the EAX register 402A is to be read during cycle 3 and that the data to be loaded into the EAX register 402A is to be available during the cycle 4. Here, the source/destination compare unit 618 detects an operand data conflict between the register specification registers 610 and 600. Specifically, the EAX register 402A is to be read for the INC instruction before the result of the LOAD instruction, which is to be loaded into the EAX register 402A, is generally available. The source/destination compare unit 618 indicates to the instruction compare unit 620 that there is an operand data conflict between the register specification registers 610 and 600. The instruction compare unit 620 compares the data in the instruction registers 612 and 616 to determine whether the instructions can be combined. The LOAD instruction and the INC instruction involved here can be combined using the ALU 238. As a result, there is no stall of the INC instruction, and the instruction compare unit 620 effectuates the combination of the instructions, as described below.

During a cycle 3, for the LOAD instruction, the desired address is applied to a cache memory and the contents of the memory location are loaded into the MIDR 228, as described above. Also during the cycle 3, for the ADD instruction, the ALU 238 adds the contents of the A register 220 to the contents of the B register 222. The sum is stored in the A result register 200. Thus, the A/MIDR multiplexer 230 is controlled to select the A register 220, while the B/MIDR multiplexer 232 is controlled to select the B register 222. Also, the ALU function multiplexer 348 is controlled to select the ALU function provided by the micro-instruction bus 370. This function is the add function. Finally, the A result bus multiplexer 244 is controlled to select the ALU output bus 326, and the A result register 200 is controlled to load its input value. Also during the cycle 3, for the INC instruction, the contents of the EAX register 402A are loaded into the A register 220, and an immediate data value of 1 is loaded into the B register 222. The data from the EAX register 402A is old because the LOAD instruction has not yet completed. The instruction combination unit 620 ensures that the old data is not used. Also, the data from the register specification registers 602, 604, and 608 is loaded into the respective register specification registers 606, 608, and 610, the data from the instruction registers 612 and 614 is loaded into the respective instruction registers 614 and 616, and the register specification registers 600, 602, and 604 and the instruction register 612 are cleared.

Also during the cycle 3, the instruction combination unit 378 controls the flag register multiplexer 242 using the flag register multiplexer control bus 376 to select appropriate flag data for the flag register 248. In this example, each of the 3:1 multiplexers 242O, 242S, 242Z, 242A, 242P and 242C is controlled to select the data generated by the ALU 238 because the ADD instruction, which affects all six status bits 248O, 248S, 248Z, 248A, 248P, and 248C, is executed during the cycle 3 by the ALU 238. The instruction combination unit 378 also controls the flag register 248 to load the selected data values.

During a cycle 4, for the ADD instruction, the EDX register 402C loads the value from the A result register bus 254, as described above relative to the previous ADD instruction. Also during a cycle 4, for the combination of the LOAD instruction and the INC instruction, the ALU 238 increments the contents of the MIDR 228 by one. The result is stored in the A result register 200. Thus, the A/MIDR multiplexer 230 is controlled to select the MIDR register 228, and the ALU function multiplexer 348 is controlled to select the ALU function provided by the substitute ALU function bus 344. This function is the increment function. Finally, the A result bus multiplexer 244 is controlled to select the ALU output bus 326, and the A result register 200 is controlled to load its input value. The load of the A result register 200 is controlled by the operand source selector 218 based on data received from the instruction combination unit 378 over the register specification bus 359. Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, the 3:1 multiplexers 242O, 242S, 242Z, 242A, and 242P are controlled to select the data generated by the ALU 238 because the combination of the LOAD instruction and the INC instruction is executed during the cycle 4 by the ALU 238, and because the INC instruction affects the five status bits 248O, 248S, 248Z, 248A, and 248P. Also, the 3:1 multiplexer 242C is controlled to select the data from the flag register 248 because the combination of the LOAD instruction and the INC instruction does not affect the status bit 248C. The instruction combination unit 378 also controls the flag register 248 to load the selected data values.

During a cycle 5, for the combination of the LOAD instruction and the INC instruction, the EAX register 402A loads the value from the A result register bus 254, as described above relative to the previous ADD instruction. Also, the register specification register 610 and the instruction register 616 are cleared. After the cycle 5, execution of all three instructions of Table 5 is complete, and the EAX register 402A contains a value that is one greater than the contents of the addressed memory location from the LOAD instruction.

As another example of the instruction combination aspects of the present invention, the general execution of a different sequence of three pipelined macro-instructions is described. Assume the following generic macro-instructions are executed by the microprocessor 100:

LOAD EAX, mem(DS+displacement)
ADD EDX, EDX, EBX
SHIFT ESI, ESI, ECX

The LOAD instruction and the ADD instruction are the same as described above. The SHIFT instruction requires that the contents of the ESI register 402G be shifted right by the value in the ECX register 402B and stored back into the ESI register 402G. The SHIFT instruction writes to the status bits 248S, 248Z, 248P, and 248C. The execution of this sequence of instructions is illustrated in Table 6 below.

During a cycle 0 (not shown), the LOAD instruction is fetched from the instruction queue 114, as described above. Also, the data from the register specification buses 104, 106 and 108 is loaded into the register specification registers 600, 602 and 604, and the data from the instruction bus 110 is loaded into the instruction register 612, as described above.

During a cycle 1, for the LOAD instruction, the contents of the DS register 386 are loaded into a segment register (not shown) for calculating the appropriate memory address, as described above. Also during the cycle 1, the ADD instruction is fetched from the instruction queue 114, as described above with reference to the previous ADD instructions. Also, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the data to be loaded into the EAX register 402A is to be available during the cycle 4, and the data in the register specification register 600 indicates that the EDX register 402C and the EBX register 402D are to be read during cycle 2 and that the data to be loaded into the EDX register 402C is to be available during the cycle 3. Here, the source/destination compare unit 618 detects no operand data conflicts.

During a cycle 2, for the LOAD instruction, the desired address is transferred to the MCU 115 over the address bus 122, as described above. Also during the cycle 2, for the ADD instruction, the contents of the EDX register 402C are loaded into the A register 220, and the contents of the EBX register 402D are loaded into the B register 222, as described above. Also during the cycle 2, the SHIFT instruction is fetched from the instruction queue 114, as described above with reference to the LOAD, ADD and INC instructions. The data from the register specification registers 602, 604, and 608 is loaded into the respective register specification registers 606, 608 and 610, the data from the register specification buses 104, 106 and 108 are loaded into the respective register specification registers 600, 602 and 604, the data from the instruction registers 612 and 614 are loaded into the respective instruction registers 614 and 616, and the data from the instruction bus 110 is loaded into the instruction register 612. Again, there are no operand data conflicts.

During a cycle 3, for the LOAD instruction, the desired address is applied to a cache memory and the contents of the memory location are loaded into the MIDR 228, as described above. Also during the cycle 3, for the ADD instruction, the ALU 238 adds the contents of the A register 220 to the contents of the B register 222. The sum is stored in the A result register 200, as described above. Also during the cycle 3, for the SHIFT instruction, the contents of the ECX register 402B are loaded into the C register 224, and the contents of the ESI register 402G are loaded into the D register 226. Also, the data from the register specification registers 602, 604, and 608 is loaded into the respective register specification registers 606, 608, and 610, the data from the instruction registers 612 and 614 is loaded into the respective instruction registers 614 and 616, and the register specification registers 600, 602, and 604 and the instruction register 612 are cleared.

Also during the cycle 3, the instruction combination unit 378 controls the flag register multiplexer 242 using the flag register multiplexer control bus 376 to select appropriate flag data for the flag register 248. In this example, each of the 3:1 multiplexers 242O, 242S, 242Z, 242A, 242P and 242C is controlled to select the data generated by the ALU 238 because the ADD instruction, which affects all six status bits 248O, 248S, 248Z, 248A, 248P, and 248C, is executed during the cycle 3 by the ALU 238. The instruction combination unit 378 also controls the flag register 248 to load the selected data values.

During a cycle 4, for the LOAD instruction, the contents of the MIDR 228 pass through the ALU 238 and are stored in the A result register 200. Specifically, the A/MIDR multiplexer 230 selects the data from the MIDR 228, the ALU function multiplexer control line 346 selects the function from the micro-instruction bus 170, which indicates a pass through function, and the A result bus multiplexer 244 selects the ALU output. Also during the cycle 4, for the ADD instruction, the EDX register 402C loads the value from the A result register bus 254, as described above. Also during the cycle 4, for the SHIFT instruction, the barrel shifter 240 shifts the contents of the D register 226 to the right by an amount indicated by the C register 224, and the result is loaded into the B result register 202. Specifically, the C/MIDR multiplexer 234 selects the data from the C register 224, the D/MIDR multiplexer 236 selects the data from the D register 226, the barrel shifter function multiplexer control line 342 selects the function from the micro-instruction bus 170, which indicates a right shift function, and the B result bus multiplexer 246 selects the barrel shifter output. Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, the 3:1 multiplexers 242S, 242Z, 242P, and 242C are controlled to select the data generated by the barrel shifter 240 because the SHIFT instruction is executed during the cycle 4 by the barrel shifter 240, and the SHIFT instruction affects the four status bits 248S, 248Z, 248P, and 248C. Also, the 3:1 multiplexers 242O and 242A are controlled to select the data from the flag register 248 because neither the LOAD instruction nor the SHIFT instruction affects the status bits 248O and 248A. The instruction combination unit 378 also controls the flag register 248 to load the selected data values.

During a cycle 5, for the LOAD instruction, the EAX register 402A loads the value from the A result register bus 254, as described above relative to the combination of the LOAD instruction and the INC instruction. Also during the cycle 5, for the SHIFT instruction, the ESI register 402G loads the value from the B result register bus 256. Also, the register specification register 610 and the instruction register 616 are cleared. After the cycle 5, execution of all three instructions of Table 5 is complete. Although a load of data from memory is normally passed through the barrel shifter 240, the present example illustrates that the ALU 238 is used when the barrel shifter 240 is required for another instruction, during the same clock cycle.

As another example of the instruction combination aspects of the present invention, the general execution of a different sequence of two pipelined macro-instructions is described. Assume the following generic macro-instructions are executed by the microprocessor 100:

LOAD EAX, mem(DS+displacement)
SHIFT EAX, EAX, ECX

The LOAD instruction is the same as described above. The SHIFT instruction requires that the contents of the EAX register 402A be shifted right by the value in the ECX register 402B and stored back into the EAX register 402A. The execution of this sequence of instructions is illustrated in Table 7 below.

During a cycle 0 (not shown), the LOAD instruction is fetched from the instruction queue 114, as described above. Also, the data from the register specification buses 104, 106 and 108 is loaded into the register specification registers 600, 602 and 604, and the data from the instruction bus 110 is loaded into the instruction register 612, as described above.

During a cycle 1, for the LOAD instruction, the contents of the DS register 386 are loaded into a segment register (not shown) for calculating the appropriate memory address, as described above. Also during the cycle 1, the SHIFT instruction is fetched from the instruction queue 114, as described above with reference to the previous SHIFT instruction. Also, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the data to be loaded into the EAX register 402A is to be available during the cycle 4, and the data in the register specification register 600 indicates that the EAX register 402A and the ECX register 402B are to be read during cycle 2 and that the data to be loaded into the EAX register 402A is to be available during the cycle 3. Here, the source/ destination compare unit 618 detects an operand data conflict between the register specification registers 608 and 600. Specifically, the register specification register 600 indicates that the EAX register 402A is to be read for the SHIFT instruction before the result of the LOAD instruction, which is to be loaded into the EAX register 402A, is available. Under these circumstances, the microprocessor 100 must stall the execution of the SHIFT instruction.

During a cycle 2, for the LOAD instruction, the desired address is transferred to the MCU 115 over the address bus 122, as described above. Also during the cycle 2, for the SHIFT instruction, the contents of the EAX register 402A are loaded into the D register 226, and the contents of the ECX register 402B are loaded into the C register 224. However, the data from the EAX register 402A is old because the LOAD instruction has not yet loaded the new data from memory. As described above, the source/ destination compare unit 618 detects an operand data conflict and the instruction compare unit 620 stalls execution of the SHIFT instruction. Therefore, the data loaded from the EAX register 402A is not used. Also, the data from the register specification register 608 is loaded into the register specification register 610, the data from the instruction register 614 is loaded into the instruction register 616, and the register specification registers 606 and 608 and the instruction register 614 are cleared. The contents of the register specification registers 600, 602 and 604 and the instruction register 612 are not changed because the SHIFT instruction has been stalled for a cycle. Now the data in the register specification register 610 indicates that the data to be loaded into the EAX register 402A is to be available during cycle 4, and the data in the register specification register 600 indicates that the EAX register 402A and the ECX register 402B are to be read during cycle 3 and that the data to be loaded into the EAX register 402A is to be available during the cycle 4. Here, the source/destination compare unit 618 detects an operand data conflict between the register specification registers 610 and 600. Specifically, the EAX register 402A is to be read for the SHIFT instruction before the result of the LOAD instruction, which is to be loaded into the EAX register 402A, is generally available. The source/destination compare unit 618 indicates to the instruction compare unit 620 that there is an operand data conflict between the register specification registers 610 and 600. The instruction compare unit 620 compares the data in the instruction registers 612 and 616 to determine whether the instructions can be combined. The LOAD instruction and the SHIFT instruction involved here can be combined using the barrel shifter 240. As a result, there is no further stall of the SHIFT instruction, and the instruction compare unit 620 effectuates the combination of the instructions, as described below.

During a cycle 3, for the LOAD instruction, the desired address is applied to a cache memory and the contents of the memory location are loaded into the MIDR 228, as described above. Also during the cycle 3, for the SHIFT instruction, the contents of the EAX register 402A are again loaded into the D register 226, and the contents of the ECX register 402B are again loaded into the C register 224, as described above. The data from the EAX register 402A is still old because the LOAD instruction still has not yet completed. The instruction combination unit 620 ensures that the old data is not used. Also, the data from the register specification registers 602 and 604 is loaded into the respective register specification registers 606 and 608, the data from the instruction register 612 is loaded into the instruction register 614, and the register specification registers 600, 602, 604 and 610 and the instruction register 616 are cleared.

During a cycle 4, for the combination of the LOAD instruction and the SHIFT instruction, the barrel shifter 240 shifts the contents of the MIDR 228 to the right by the value contained in the C register 224. The result is stored in the B result register 202. Thus, the D/MIDR multiplexer 236 is controlled to select the MIDR register 228, while the C/MIDR multiplexer 234 is controlled to select the C register 224. Also, the barrel shifter function multiplexer 350 is controlled to select the barrel shifter function provided by the substitute barrel shifter function bus 340. This function is the shift right function. Finally, the B result bus multiplexer 246 is controlled to select the barrel shifter output bus 328, and the B result register 202 is controlled to load its input value. The load of the B result register 202 is controlled by the operand source selector 218 based on data received from the instruction combination unit 378 over the register specification bus 359. Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, the 3:1 multiplexers 242S, 242Z, 242P, and 242C are controlled to select the data generated by the barrel shifter 240 because the combination of the LOAD instruction and the SHIFT instruction is executed during the cycle 4 by the barrel shifter 240, and because the SHIFT instruction affects the four status bits 248S, 248Z, 248P, and 248C. Also, the 3:1 multiplexers 242O and 242A are controlled to select the data from the flag register 248 because the combination of the LOAD instruction and the SHIFT instruction does not affect the status bits 248O and 248A. The instruction combination unit 378 also controls the flag register 248 to load the selected data values.

During a cycle 5, for the combination of the LOAD instruction and the SHIFT instruction, the EAX register 402A loads the value from the B result register bus 256. Specifically, the operand source selector 218 causes the 2-to-1 multiplexer 400A to apply the signals on the B result register bus 256 to the EAX input bus 450A. Also, the operand source selector 218 causes the EAX register 402A to load the corresponding value. Again, the operand source selector 218 is responsive to data on the register specification bus 359. Also, the register specification register 610 and the instruction register 612 and 616 are cleared. After the cycle 5, execution of both the LOAD instruction and the SHIFT instruction is complete, and the contents of the addressed memory location from the LOAD instruction have been shifted to the right by the value in the ECX register 402B and loaded into the EAX register 402A.

Under the circumstances described above, the present invention uses the barrel shifter 240 to combine the LOAD instruction with the SHIFT instruction for simultaneous execution.

As another example of the instruction combination aspects of the present invention, the general execution of a different sequence of two pipelined macro-instructions is described. Assume the following generic macro-instructions are executed by the microprocessor 100:

LOAD ECX, mem(DS+displacement)

SHIFT EDX, EDX, ECX

The LOAD instruction is the same as described above, except that the memory data is loaded into the ECX register 402B. The SHIFT instruction requires that the contents of the EDX register 402C be shifted right by the value in the ECX register 402B and stored back into the EDX register 402C. The execution of this sequence of instructions is illustrated in Table 8 below.

During a cycle 0 (not shown), the LOAD instruction is fetched from the instruction queue 114, as described above. Also, the data from the register specification buses 104, 106 and 108 is loaded into the register specification registers 600, 602 and 604, and the data from the instruction bus 110 is loaded into the instruction register 612, as described above.

During a cycle 1, for the LOAD instruction, the contents of the DS register 386 are loaded into a segment register (not shown) for calculating the appropriate memory address, as described above. Also during the cycle 1, the SHIFT instruction is fetched from the instruction queue 114, as described above with reference to the previous SHIFT instruction. Also, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the data to be loaded into the ECX register 402B is to be available during the cycle 4, and the data in the register specification register 600 indicates that the ECX register 402B and the EDX register 402C are to be read during cycle 2 and that the data to be loaded into the EDX register 402C is to be available during the cycle 3. Here, the source/destination compare unit 618 detects an operand data conflict between the register specification registers 608 and 600. Specifically, the register specification register 600 indicates that the ECX register 402B is to be read for the SHIFT instruction before the result of the LOAD instruction, which is to be loaded into the ECX register 402B, is available. Under these circumstances, the microprocessor 100 must stall the execution of the SHIFT instruction.

During a cycle 2, for the LOAD instruction, the desired address is transferred to the MCU 115 over the address bus 122, as described above. Also during the cycle 2, for the SHIFT instruction, the contents of the ECX register 402B are loaded into the C register 224, and the contents of the EDX register 402C are loaded into the D register 226. However, the data from the ECX register 402B is old because the LOAD instruction has not yet loaded the new data from memory. As described above, the source/destination compare unit 618 detects an operand data conflict and the instruction compare unit 620 stalls execution of the SHIFT instruction. Therefore, the data loaded from the ECX register 402B is not used. Also, the data from the register specification register 608 is loaded into the register specification register 610, the data from the instruction register 614 is loaded into the instruction register 616, and the register specification registers 606 and 608 and the instruction register 614 are cleared. The contents of the register specification registers 600, 602 and 604 and the instruction register 612 are not changed because the SHIFT instruction has been stalled for a cycle. Now the data in the register specification register 610 indicates that the data to be loaded into the ECX register 402B is to be available during cycle 4, and the data in the register specification register 600 indicates that the ECX register 402B and the EDX register 402C are to be read during cycle 3 and that the data to be loaded into the EDX register 402C is to be available during the cycle 4. Here, the source/destination compare unit 618 detects an operand data conflict between the register specification registers 610 and 600. Specifically, the ECX register 402B is to be read for the SHIFT instruction before the result of the LOAD instruction, which is to be loaded into the ECX register 402B, is generally available. The source/destination compare unit 618 indicates to the instruction compare unit 620 that there is an operand data conflict between the register specification registers 610 and 600. The instruction compare unit 620 compares the data in the instruction registers 612 and 616 to determine whether the instructions can be combined. The LOAD instruction and the SHIFT instruction involved here can be combined using the barrel shifter 240. As a result, there is no further stall of the SHIFT instruction, and the instruction compare unit 620 effectuates the combination of the instructions, as described below.

During a cycle 3, for the LOAD instruction, the desired address is applied to a cache memory and the contents of the memory location are loaded into the MIDR 228, as described above. Also during the cycle 3, for the SHIFT instruction, the contents of the ECX register 402B are again loaded into the C register 224, and the contents of the EDX register 402C are again loaded into the D register 226, as described above. The data from the ECX register 402B is still old because the LOAD instruction still has not yet completed. The instruction combination unit 620 ensures that the old data is not used. Also, the data from the register specification registers 602 and 604 is loaded into the respective register specification registers 606 and 608, the data from the instruction register 612 is loaded into the instruction register 614, and the register specification registers 600, 602, 604 and 610 and the instruction register 616 are cleared.

During a cycle 4, for the LOAD instruction, the ALU 238 passes the value from the MIDR 228 through to the A result register 200. Thus, the A/MIDR multiplexer 230 is controlled to select the MIDR 228, and the ALU function multiplexer 348 is controlled to select the ALU function provided by the substitute ALU function bus 344. This function causes the ALU 238 to pass the data from the A/MIDR multiplexer 230 through without any changes. Finally, the A result bus multiplexer 244 is controlled to select the ALU output bus 326, and the A result register 200 is controlled to load its input value. Also during the cycle 4, for the combination of the LOAD instruction and the SHIFT instruction, the barrel shifter 240 shifts the contents of the D register 226 to the right by the value contained in the MIDR 228. The result is stored in the B result register 202. Thus, the D/MIDR multiplexer 236 is controlled to select the D register 226, while the C/MIDR multiplexer 234 is controlled to select the MIDR register 228. Also, the barrel shifter function multiplexer 350 is controlled to select the barrel shifter function provided by the substitute barrel shifter function bus 340. This function is the shift right function. Finally, the B result bus multiplexer 246 is controlled to select the barrel shifter output bus 328, and the B result register 202 is controlled to load its input value. The load of the result registers 200 and 202 is controlled by the operand source selector 218 based on data received from the instruction combination unit 378 over the register specification bus 359. Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, the 3:1 multiplexers 242S, 242Z, 242P, and 242C are controlled to select the data generated by the barrel shifter 240 because the SHIFT instruction is executed during the cycle 4 by the barrel shifter 240, and because the SHIFT instruction affects the four status bits 248S, 248Z, 248P, and 248C. Also, the 3:1 multiplexers 242O and 242A are controlled to select the data from the flag register 248 because neither the LOAD instruction nor the SHIFT instruction affects the status bits 248O and 248A. The instruction combination unit 378 also controls the flag register 248 to load the selected data values.

During a cycle 5, for the LOAD instruction, the ECX register 402B loads the value from the A result register bus 254. Specifically, the operand source selector 218 causes the 2-to-1 multiplexer 400B to apply the signals on the A result register bus 254 to the ECX input bus 450B. Also, the operand source selector 218 causes the ECX register 402B to load the corresponding value. Also during the cycle 5, for the combination of the LOAD instruction and the SHIFT instruction, the EDX register 402C loads the value from the B result register bus 256. Specifically, the operand source selector 218 causes the 2-to-1 multiplexer 400C to apply the signals on the B result register bus 256 to the EDX input bus 450C. Also, the operand source selector 218 causes the EDX register 402C to load the corresponding value. Again, the operand source selector 218 is responsive to data on the register specification bus 359. Also, the register specification register 610 and the instruction register 616 are cleared. After the cycle 5, execution of both the LOAD instruction and the SHIFT instruction is complete, and the contents of the addressed memory location from the LOAD instruction have been loaded into the ECX register 402B, and the contents of the EDX register 402C have been shifted to the right by the value in the addressed memory location and loaded back into the EDX register 402C.

Under the circumstances described above, the present invention uses the barrel shifter 240 to combine the LOAD instruction with the SHIFT instruction for simultaneous execution. However, the ALU 238 is also used to complete the load of the memory data into the ECX register 402B.

Several of the examples described above involve operand data conflicts. Three examples described below, on the other hand, involve flag update conflicts. A flag update conflict can arise when the following circumstances are satisfied:

an earlier fetched instruction and a later fetched instruction both access at least one common status bit;

the later fetched instruction is ready to access the status bit(s) before, or during the same clock cycle as, the earlier fetched instruction; and the access for the earlier fetched instruction and the access for the later fetched instruction satisfy one of the following three conditions:

both the earlier fetched instruction and the later fetched instruction involve status data writes;

the earlier fetched instruction involves a status data write, while the later fetched instruction involves a status data read; or the earlier fetched instruction involves a status data read, while the later fetched instruction involves a status data write.

A flag update conflict does not generally arise when both the earlier fetched instruction and the later fetched instruction involve status data reads. Also, in the preferred embodiment, a write of status data by an earlier fetched instruction during the same clock cycle as a read of status data by a later fetched instruction does not cause a flag update conflict because the later fetched instruction obtains the status data after it is modified by the earlier fetched instruction, as intended.

The source/destination compare unit 618 detects flag update conflicts by monitoring the contents of the register specification registers 600, 602, 604, 606, 608 and 610. As indicated above, the register specification registers 600, 602, 604, 606, 608 and 610 are loaded with data that indicates which status bits 248O, 248S, 248Z, 248A, 248P and 248C are accessed during which cycles by the corresponding instructions.

Referring again to the example of Table 2, after the cycle 1, the register specification register 608 indicates that the status results from the LOAD instruction are to be available during the cycle 4, but that the LOAD instruction does not affect any of the status bits 248O, 248S, 248Z, 248A, 248P and 248C. Also, the register specification register 600 indicates that the ADD instruction is to write to each of the status bits 248O, 248S, 248Z, 248A, 248P and 248C during the cycle 3. Although the LOAD instruction completes execution after the ADD instruction accesses the flag register 248, the source/destination compare unit 618 does not detect a flag update conflict because the LOAD instruction does not access any of the status bits 248O, 248S, 248Z, 248A, 248P and 248C. The source/destination compare unit 618 does not detect a flag update conflict after subsequent cycles for the same reason.

The check for flag update conflicts relative to the example of Table 3 is similar to the check for flag update conflicts relative to the example of Table 2. Again, the source/destination compare unit 618 does not detect a flag update conflict because the LOAD instruction does not access any of the status bits 248O, 248S, 248Z, 248A, 248P and 248C.

Referring again to the example of Table 5, after the cycle 1, the register specification register 608 indicates that the status results from the LOAD instruction are to be available during the cycle 4, but that the LOAD instruction does not affect any of the status bits 248O, 248S, 248Z, 248A, 248P, and 248C. Also, the register specification register 600 indicates that the ADD instruction is to write to each of the status bits 248O, 248S, 248Z, 248A, 248P and 248C during the cycle 3. Again, the source/destination compare unit 118 detects no flag update conflict. After the cycle 2, the register specification register 600 indicates that the INC instruction is to write to each of the status bits 248O, 248S, 248Z, 248A, and 248P during the cycle 4. Again, the source/destination compare unit 618 does not detect a flag update conflict because the LOAD instruction does not access any of the status bits 248O, 248S, 248Z, 248A, 248P and 248C and because the ADD instruction and the INC instruction access the flag register 248 in the same order in which the instructions were fetched.

Referring again to the example of Table 6, after the cycle 1, the register specification register 608 indicates that the LOAD instruction does not access the flag register 248, and the register specification register 600 indicates that the ADD instruction is to write to each of the status bits 248O, 248S, 248Z, 248A, 248P and 248C during the cycle 3. Again, the source/destination compare unit 118 detects no flag update conflict. After the cycle 2, the register specification register 600 indicates that the SHIFT instruction is to write to each of the status bits 248S, 248Z, 248P, and 248C during the cycle 4. Again, the source/destination compare unit 618 does not detect a flag update conflict because the LOAD instruction does not access any of the status bits 248O, 248S, 248Z, 248A, 248P and 248C and because the ADD instruction and the SHIFT instruction access the flag register 248 in the same order in which the instructions were fetched.

The check for flag update conflicts relative to the example of Table 7 is similar to the check for flag update conflicts relative to the examples of Tables 2 and 3. Again, the source/destination compare unit 618 does not detect a flag update conflict because the LOAD instruction does not access any of the status bits 248O, 248S, 248Z, 248A, 248P and 248C. In the example of Table 7, the SHIFT instruction accesses the status bits 248S, 248Z, 248P and 248C.

The check for flag update conflicts relative to the example of Table 8 is similar to the check for flag update conflicts relative to the examples of Tables 2, 3 and 7. Again, the source/destination compare unit 618 does not detect a flag update conflict because the LOAD instruction does not access any of the status bits 248O, 248S, 248Z, 248A, 248P and 248C. Again in the example of Table 8, the SHIFT instruction accesses the status bits 248S, 248Z, 248P and 248C.

As another example of the instruction combination aspects of the present invention, the general execution of another pair of pipelined macro-instructions is described. Assume the following generic macro-instructions are executed by the microprocessor 100:

ADD EAX, EAX, mem(DS+displacement)
JUMPZ ERROR

The ADD instruction requires that a value stored in memory be added to the contents of the EAX register 402A and that the sum be loaded back into the EAX register 402A. The address location of the value in memory that is to be used for the operation is determined by adding the displacement to the memory address referenced by the DS register 386. The ADD instruction writes to each of the status bits 248O, 248S, 248Z, 248A, 248P, and 248C. The JUMPZ instruction requires that the zero status bit 248Z be tested. If the zero status bit 248Z is set, program execution continues at an address obtained by adding a value represented by a programming constant referred to as ERROR to the current value of an instruction pointer (not shown). If the zero status bit 248Z is not set, program execution continues at the subsequent instruction address. The JUMPZ instruction reads the status bit 248Z, but it does not access any of the other status bits 248O, 248S, 248A, 248P, and 248C. The execution of this sequence of instructions is illustrated in Table 9 below.

During a cycle 0 (not shown), the ADD instruction is fetched from the instruction queue 114, as described above with reference to the previous ADD instructions. Also, the data from the register specification buses 104, 106 and 108 is loaded into the register specification registers 600, 602 and 604, and the data from the instruction bus 110 is loaded into the instruction register 612, as described above. At this point, the data in the register specification register 604 indicates that the EAX register 402A is to be read during a cycle 3, that the data to be loaded into the EAX register 402A is to be available during a cycle 4, and that the ADD instruction is to write to each of the status bits 248O, 248S, 248Z, 248A, 248P, and 248C during the cycle 4.

During a cycle 1, for the ADD instruction, the contents of the DS register 386 are loaded into a segment register (not shown) for calculating the appropriate memory address, as described above with reference to the LOAD instruction. Also during the cycle 1, the JUMPZ instruction is fetched from the instruction queue 114, as described above with reference to the previous LOAD, ADD, INC and SHIFT instructions. Also, the instruction control unit 112 calculates an address to which program execution will be transferred if the condition of the JUMPZ instruction is satisfied. This address is determined by adding the value represented by the programming constant ERROR to the current value of the instruction pointer. The resulting address is stored in a jump address register (not shown).

Also during the cycle 1, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the EAX register 402A is to be read during the cycle 3, that the data to be loaded into the EAX register 402A is to be available during the cycle 4, and that the ADD instruction is to write to each of the status bits 248O, 248S, 248Z, 248A, 248P, and 248C during the cycle 4. The data in the register specification register 600 indicates that the JUMPZ instruction is to read the zero status bit 248Z during a cycle 2. Here, the source/destination compare unit 618 detects a flag update conflict between the register specification registers 600 and 608. Specifically, the zero status bit 248Z is to be read for the JUMPZ instruction during the cycle 2, while the ADD instruction will not write to the zero status bit 248Z until the cycle 4. The JUMPZ instruction is supposed to determine whether or not to perform the jump based on the result of the ADD instruction. Thus, the JUMPZ instruction cannot proceed until the status results from the ADD instruction are available. Under these circumstances, the microprocessor 100 must stall the execution of the JUMPZ instruction.

During a cycle 2, for the ADD instruction, the desired address is transferred to the MCU 115 over the address bus 122, as described above. As described above, the source/destination compare unit 618 detects a flag update conflict and the instruction compare unit 620 stalls execution of the JUMPZ instruction. Also, the data from the register specification register 608 is loaded into the register specification register 610, the data from the instruction register 614 is loaded into the instruction register 616, and the register specification register 608 and the instruction register 614 are cleared. The contents of the register specification registers 600, 602 and 604 and the instruction register 612 are not changed because the JUMPZ instruction has been stalled for a cycle. Now the data in the register specification register 610 indicates that the EAX register 402A is to be read during the cycle 3, that the data to be loaded into the EAX register 402A is to be available during the cycle 4, and that the ADD instruction is to write to each of the status bits 248O, 248S, 248Z, 248A, 248P, and 248C during the cycle 4. The data in the register specification register 600 indicates that the JUMPZ instruction is to read the zero status bit 248Z during a cycle 3. Here, the source/destination compare unit 618 detects a flag update conflict between the register specification registers 600 and 610. Specifically, the zero status bit 248Z is to be read for the JUMPZ instruction during the cycle 3, while the ADD instruction will not write to the zero status bit 248Z until the cycle 4. Again, under these circumstances, the microprocessor 100 must stall the execution of the JUMPZ instruction.

During a cycle 3, for the ADD instruction, the contents of the EAX register 402A are loaded into the A register 220 and the desired memory address is applied to a cache memory and the contents of the memory location are loaded into the MIDR 228, as described above. Also, the register specification register 610 and the instruction register 616 are cleared. The contents of the register specification registers 600, 602, 604, 606 and 608 and the instruction registers 612 and 614 are not changed because the JUMPZ instruction has been stalled for another cycle. Now the data in the register specification register 600 indicates that the JUMPZ instruction is to read the zero status bit 248Z during a cycle 4. Here, the source/destination compare unit 618 does not detect a flag update conflict. The zero status bit 248Z is to be written by the ADD instruction and read by the JUMPZ instruction, both during the cycle 4. The data presented to the flag register 248, to be written in at the end of the clock cycle, is also made available for the JUMPZ instruction so that it may proceed before the end of the cycle. Execution of the JUMPZ instruction now resumes.

During a cycle 4, for the ADD instruction, the ALU 238 adds the contents of the A register 220 to the contents of the MIDR 228. This sum is stored in the A result register 200. Thus, the A/MIDR multiplexer 230 is controlled to select the A register 220, while the B/MIDR multiplexer 232 is controlled to select the MIDR 228. Also, the ALU function multiplexer 348 is controlled to select the ALU function provided by the micro-instruction bus 170. This function is the add function. Finally, the A result bus multiplexer 244 is controlled to select the ALU output bus 326, and the A result register 200 is controlled to load its input value. Also, the data from the register specification registers 602 and 604 is loaded into the register specification registers 606 and 608, respectively, the data from the instruction register 612 is loaded into the instruction register 614, and the register specification registers 600, 602 and 604 and the instruction register 612 are cleared.

Also during the cycle 4, the instruction combination unit 378 controls the flag register multiplexer 242 using the flag register multiplexer control bus 376 to select appropriate flag data for the flag register 248. In this situation each of the 3:1 multiplexers 242O, 242S, 242Z, 242A, 242P and 242C is controlled to select the data generated by the ALU 238 because the ADD instruction is executed during the cycle 4 by the ALU 238, and because the ADD instruction affects all six status bits 248O, 248S, 248Z, 248A, 248P, and 248C. The instruction combination unit 378 also controls the flag register 248 to load the selected data values. Finally, the zero status bit 248Z of the flag register 248 is read to determine whether or not to execute the jump.

During a cycle 5, for the ADD instruction, the EAX register 402A loads the value from the A result register bus 254. Also, the data from the register specification register 608 is loaded into the register specification register 610, the data from the instruction register 614 is loaded into the instruction register 616, and the register specification registers 606 and 608 and the instruction register 614 are cleared. During a cycle 6 (not shown), the register specification register 610 and the instruction register 616 are cleared. After the cycle 5, execution of both the ADD instruction and the JUMPZ instruction is complete.

As another example of the instruction combination aspects of the present invention, the general execution of another pair of pipelined macro-instructions is described. Assume the following generic macro-instructions are executed by the microprocessor 100:

ADD EAX, EAX, mem(DS+displacement)
SHIFT EDX, EDX, ECX

The ADD instruction is the same as the ADD instruction described in the example of Table 9. The SHIFT instruction is the same as the SHIFT instruction described in the example of Table 8. The execution of this sequence of instructions is illustrated in Table 10 below.

During a cycle 0 (not shown), the ADD instruction is fetched from the instruction queue 114, as described above with reference to the previous ADD instructions. Also, the data from the register specification buses 104, 106 and 108 is loaded into the register specification registers 600, 602 and 604, and the data from the instruction bus 110 is loaded into the instruction register 612, as described above. At this point, the data in the register specification register 604 indicates that the EAX register 402A is to be read during a cycle 3, that the data to be loaded into the EAX register 402A is to be available during a cycle 4, and that the ADD instruction is to write to each of the status bits 248O, 248S, 248Z, 248A, 248P, and 248C during the cycle 4.

During a cycle 1, for the ADD instruction, the contents of the DS register 386 are loaded into a segment register (not shown) for calculating the appropriate memory address, as described above with reference to the previous ADD instruction. Also during the cycle 1, the SHIFT instruction is fetched from the instruction queue 114, as described above with reference to the previous SHIFT instructions.

Also during the cycle 1, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the EAX register 402A is to be read during the cycle 3, that the data to be loaded into the EAX register 402A is to be available during the cycle 4 and that the ADD instruction is to write to each of the status bits 248O, 248S, 248Z, 248A, 248P, and 248C during the cycle 4. The data in the register specification register 600 indicates that the ECX register 402B and the EDX register 402C are to be read during a cycle 2, that the data to be loaded into the EDX register 402C is to be available during the cycle 3, and that the SHIFT instruction is to write to the status bits 248S, 248Z, 248P, and 248C during the cycle 3. Here, the source/destination compare unit 618 does not detect an operand data conflict, but it detects a flag update conflict between the register specification registers 608 and 600. Specifically, the status bits 248S, 248Z, 248P and 248C are to be written by the SHIFT instruction during the cycle 3, while the ADD instruction will not write to these same status bits 248S, 248Z, 248P and 248C until the cycle 4. If this conflict is not resolved in some way, the status data from the ADD instruction will overwrite the status data from the SHIFT instruction, and subsequent instructions may test the status data from the ADD instruction, instead of from the SHIFT instruction. These programming instructions are not intended to operate in this manner. In the preferred embodiment, the microprocessor 100 stalls the execution of the SHIFT instruction, under these circumstances.

During a cycle 2, for the ADD instruction, the desired address is transferred to the MCU 115 over the address bus 122, as described above. Also during the cycle 2, for the SHIFT instruction, the contents of the ECX register 402B are loaded into the C register 224, and the contents of the EDX register 402C are loaded into the D register 226. As described above, the source/destination compare unit 618 detects a flag update conflict and the instruction compare unit 620 stalls execution of the SHIFT instruction. Also, the data from the register specification register 608 is loaded into the register specification register 610, the data from the instruction register 614 is loaded into the instruction register 616, and the register specification register 608 and the instruction register 614 are cleared. The contents of the register specification registers 600, 602 and 604 and the instruction register 612 are not changed because the SHIFT instruction has been stalled for a cycle. Now the data in the register specification register 610 indicates that the EAX register 402A is to be read during the cycle 3, that the data to be loaded into the EAX register 402A is to be available during the cycle 4 and that the ADD instruction is to write to each of the status bits 248O, 248S, 248Z, 248A, 248P, and 248C during the cycle 4. The data in the register specification register 600 indicates that the ECX register 402B and the EDX register 402C are to be read during the cycle 3, that the data to be loaded into the EDX register 402C is to be available during the cycle 4, and that the SHIFT instruction is to write to the status bits 248S, 248Z, 248P, and 248C during the cycle 4. Here, the source/destination compare unit 618 detects a flag update conflict between the register specification registers 600 and 610. Specifically, both the SHIFT instruction and the ADD instruction are to write to the status bits 248S, 248Z, 248P, and 248C during the cycle 4. Under these circumstances, the microprocessor 100 executes both instructions simultaneously, as described below.

During a cycle 3, for the ADD instruction, the contents of the EAX register 402A are loaded into the A register 220 and the desired memory address is applied to a cache memory and the contents of the memory location are loaded into the MIDR 228, as described above. Also during the cycle 3, for the SHIFT instruction, the contents of the ECX register 402B are loaded into the C register 224, and the contents of the EDX register 402C are loaded into the D register 226. Also, the data from the register specification registers 602 and 604 is loaded into the respective register specification registers 606 and 608, the data from the instruction register 612 is loaded into the instruction register 614, and the register specification registers 600, 602, 604 and 610 and the instruction registers 612 and 616 are cleared. Here, the source/destination compare unit 618 does not detect a flag update conflict. Again, both the SHIFT instruction and the ADD instruction are to write to the status bits 248S, 248Z, 248P, and 248C during the cycle 4.

During the cycle 4, for the ADD instruction, the ALU 238 adds the contents of the A register 220 to the contents of the MIDR 228. This sum is stored in the A result register 200. Also during the cycle 4, for the SHIFT instruction, the barrel shifter 240 shifts the contents of the D register 226 to the right by the value contained in the C register 224. The result is stored in the B result register 202. Thus, the D/MIDR multiplexer 236 is controlled to select the D register 226, while the C/MIDR multiplexer 234 is controlled to select the C register 224. Also, the barrel shifter function multiplexer 350 is controlled to select the barrel shifter function provided by the microinstruction bus 170. This function is the shift right function. Finally, the B result bus multiplexer 246 is controlled to select the barrel shifter output bus 328, and the B result register 202 is controlled to load its input value. Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, the 3:1 multiplexers 242S, 242Z, 242P, and 242C are controlled to select the data generated by the barrel shifter 240 because the SHIFT instruction is executed during the cycle 4 by the barrel shifter 240, and because the SHIFT instruction affects the four status bits 248S, 248Z, 248P, and 248C. Also, the 3:1 multiplexers 242O and 242A are controlled to select the data generated by the ALU 238 because the ADD instruction is executed during the cycle 4 by the ALU 238, and because the ADD instruction affects the two status bits 248O and 248A. The ADD instruction also generally affects the four status bits 248S, 248Z, 248P, and 248C. However, these four status bits 248S, 248Z, 248P, and 248C are also affected by the SHIFT instruction. The status results for these status bits 248S, 248Z, 248P, and 248C are obtained from the SHIFT instruction because the SHIFT instruction is the later fetched instruction. This arrangement satisfies the intended programming results. The instruction combination unit 378 also controls the flag register 248 to load the selected data values.

During a cycle 5, for the ADD instruction, the EAX register 402A loads the value from the A result register bus 254. Also during the cycle 5, for the SHIFT instruction, the EDX register 402C loads the value from the B result register bus 256. Also, the register specification register 610 and the instruction register 616 are cleared. After the cycle 5, execution of both the ADD instruction and the SHIFT instruction is complete.

As indicated above, execution of the SHIFT instruction is stalled in the preferred embodiment because of the flag update conflict between the ADD instruction and the SHIFT instruction. In an alternative embodiment, however, execution of the SHIFT instruction is not stalled. In this alternative embodiment, the status bits 248S, 248Z, 248P, and 248C are updated during the cycle 3 by the status results of the SHIFT instruction. Also, the status bits 248O and 248A are updated during the cycle 4 by the status results of the ADD instruction. During the cycle 3, the status bits 248O and 248A are loaded back into the flag register 248 through the 3:1 multiplexers 242O and 242A, respectively, again so that the values do not change. Also, during the cycle 4, the status bits 248S, 248Z, 248P and 248C are loaded back into the flag register 248 through the 3:1 multiplexers 242S, 242Z, 242P and 242C, respectively, again so that the values do not change. After the cycle 4, the contents of the flag register 248 are the same in either embodiment, but the alternative embodiment completes execution of the SHIFT instruction one clock cycle earlier.

As another example of the instruction combination aspects of the present invention, the general execution of a set of three pipelined macro-instructions is described. Assume the following generic macro-instructions are executed by the microprocessor 100:

LOAD EAX, mem(DS+displacement)
INC EAX, 1
SHIFT EDX, EDX, ECX

The LOAD instruction is the same as the LOAD instruction described in the example of Table 7. The INC instruction is the same as the INC instruction described in the example of Table 5. The SHIFT instruction is the same as the SHIFT instruction described in the example of Table 10. The execution of this sequence of instructions is illustrated in Table 11 below.

During a cycle 0 (not shown), the LOAD instruction is fetched from the instruction queue 114, as described above with reference to the previous LOAD instructions. Also, the data from the register specification buses 104, 106 and 108 is loaded into the register specification registers 600, 602 and 604, and the data from the instruction bus 110 is loaded into the instruction register 612, as described above. At this point, the data in the register specification register 604 indicates that the data to be loaded into the EAX register 402A is to be available during a cycle 4. The data in the register specification register 604 also indicates that the flag register 248 is to be loaded during the cycle 4, but that the LOAD instruction does not access any of the status bits 248O, 248S, 248Z, 248A, 248P, and 248C.

During a cycle 1, for the LOAD instruction, the contents of the DS register 386 are loaded into a segment register (not shown) for calculating the appropriate memory address, as described above. Also during the cycle 1, the INC instruction is fetched from the instruction queue 114, as described above with reference to the previous INC instruction.

Also during the cycle 1, the data from the register specification registers 602 and 604 is loaded into the respective register specification registers 606 and 608, the data in the instruction register 612 is loaded into the instruction register 614, the data from the register specification buses 104, 106 and 108 is loaded into the respective register specification registers 600, 602 and 604, and the data from the instruction bus 110 is loaded into the instruction register 612, as described above. Now the data in the register specification register 608 indicates that the data to be loaded into the EAX register 402A is to be available during the cycle 4. The data in the register specification register 600 indicates that the EAX register 402A is to be read during a cycle 2, that the data to be loaded into the EAX register 402A is to be available during a cycle 3, and that the INC instruction is to write to the status bits 248O, 248S, 248Z, 248A, and 248P during the cycle 3. Here, the source/destination compare unit 618 detects an operand data conflict between the register specification registers 608 and 600. Specifically, the register specification register 600 indicates that the EAX register 402A is to be read for the INC instruction before the result of the LOAD instruction, which is to be loaded into the EAX register 402A, is available. Under these circumstances, the microprocessor 100 must stall the execution of the INC instruction.

During a cycle 2, for the LOAD instruction, the desired address is transferred to the MCU 115 over the address bus 122, as described above. Also during the cycle 2, for the INC instruction, the contents of the EAX register 402A are loaded into the A register 220, and an immediate data value of 1 is loaded into the B register 222. However, the data from the EAX register 402A is old because the LOAD instruction has not yet loaded the new data from memory. As described above, the source/destination compare unit 618 detects an operand data conflict and the instruction compare unit 620 stalls execution of the INC instruction. Therefore, the data loaded from the EAX register 402A is not used. Also, the data from the register specification register 608 is loaded into the register specification register 610, the data from the instruction register 614 is loaded into the instruction register 616, and the register specification registers 606 and 608 and the instruction register 614 are cleared.

Also during the cycle 2, even through the INC instruction has been stalled, the SHIFT instruction is fetched from the instruction queue 114, as described above with reference to the previous SHIFT instructions. The instruction decode unit 140 generates data for the SHIFT instruction on the register specification buses 104, 106 and 108 and on the instruction bus 110. The instruction decode unit 140 maintains this data on the register specification buses 104, 106 and 108 and on the instruction bus 110 until the stall decode line 116 from the instruction combination unit 378 is deactivated. Then, the instruction control unit 112 continues fetching and decoding additional instructions. The instruction combination unit 378 determines whether the register specification data for the SHIFT instruction can be combined with the register specification data for the INC instruction in the register specification registers 600, 602 and 604. Here, the INC instruction uses the A register 220 and the B register 222, while the SHIFT instruction uses the C register 224 and the D register 226. Because the INC instruction and the SHIFT instruction do not use the same registers 220, 222, 224 and 226, the register specification data for the two instructions can be combined. Thus, the register specification data relative to the C register 224 and the D register 226 for the SHIFT instruction overwrites the register specification data relative to the C register 224 and the D register 226 for the INC instruction, in the register specification registers 600, 602 and 604. Also, the contents of the instruction register 612 are modified to indicate that the data in the register specification registers 600, 602 and 604 represent both the INC instruction and the SHIFT instruction. The instruction registers 612, 614 and 616 comprise two instruction specification fields for identifying two different instructions that are represented in the corresponding register specification registers 600, 602, 604, 606, 608 and 610. The instruction compare unit 620 indicates to the instruction control unit 112 that an additional macro-instruction should be fetched and decoded because the register specification data for the SHIFT instruction has been combined with the register specification data for the INC instruction.

Now the data in the register specification register 610 indicates that the data to be loaded into the EAX register 402A is to be available during the cycle 4. The data in the register specification register 600 indicates that the EAX register 402A is to be read during the cycle 3 for the INC instruction, that the data to be loaded into the EAX register 402A for the INC instruction is to be available during the cycle 4, that the INC instruction is to write to the status bits 248O and 248A during the cycle 4, that the ECX register 402B and the EDX register 402C are to be read during the cycle 3 for the SHIFT instruction, that the data to be loaded into the EDX register 402C for the SHIFT instruction is to be available during the cycle 4, and that the SHIFT instruction is to write to the status bits 248S, 248Z, 248P, and 248C. When attempting to load the flag update data for the SHIFT instruction into the register specification register 600, the instruction combination unit 378 detects a flag update conflict with the flag update data for the INC instruction. Specifically, both instructions are to write to the status bits 248S, 248Z and 248P during the cycle 4. The instruction combination unit 378 resolves this conflict by combining the flag update data for the INC instruction with the flag update data for the SHIFT instruction. The flag update data for the SHIFT instruction for the status bits 248S, 248Z and 248P overwrites the flag update data for the INC instruction for the same status bits 248S, 248Z and 248P because the SHIFT instruction was fetched after the INC instruction.

Here, the source/destination compare unit 618 detects an operand data conflict between the register specification registers 610 and 600. Specifically, the EAX register 402A is to be read for the INC instruction before the result of the LOAD instruction, which is to be loaded into the EAX register 402A, is generally available. The source/destination compare unit 618 indicates to the instruction compare unit 620 that there is an operand data conflict between the register specification registers 610 and 600. The instruction compare unit 620 compares the data in the instruction registers 612 and 616 to determine whether the instructions can be combined. The LOAD instruction and the INC instruction involved here can be combined using the ALU 238. As a result, there is no further stall of the INC instruction, and the instruction compare unit 620 effectuates the combination of the instructions, as described below.

During a cycle 3, for the LOAD instruction, the desired address is applied to a cache memory and the contents of the memory location are loaded into the MIDR 228, as described above. Also during the cycle 3, for the INC instruction, the contents of the EAX register 402A are loaded into the A register 220, and an immediate data value of 1 is loaded into the B register 222. Also during the cycle 3, for the SHIFT instruction, the contents of the EDX register 402C are loaded into the D register 226, and the contents of the ECX register 402B are loaded into the C register 224, as described above. The data from the EAX register 402A is still old because the LOAD instruction has not yet completed. The instruction combination unit 620 ensures that the old data is not used. Also, the data from the register specification registers 602 and 604 is loaded into the respective register specification registers 606 and 608, the data from the instruction register 612 is loaded into the instruction register 614, and the register specification registers 600, 602, 604 and 610 and the instruction registers 612 and 616 are cleared.

During a cycle 4, for the combination of the LOAD instruction and the INC instruction, the ALU 238 increments the contents of the MIDR 228 by one. The result is stored in the A result register 200. Thus, the A/MIDR multiplexer 230 is controlled to select the MIDR register 228, while the B/MIDR multiplexer 232 is controlled to select the B register 222. Also, the ALU function multiplexer 348 is controlled to select the ALU function provided by the substitute ALU function bus 344. Finally, the A result bus multiplexer 244 is controlled to select the ALU output bus 326, and the A result register 200 is controlled to load its input value. The load of the A result register 200 is controlled by the operand source selector 218 based on data received from the instruction combination unit 378 over the register specification bus 359.

Also during the cycle 4, for the SHIFT instruction, the barrel shifter 240 shifts the contents of the D register 226 to the right by the value contained in the C register 224. The result is stored in the B result register 202. Thus, the D/MIDR multiplexer 236 is controlled to select the D register 226, while the C/MIDR multiplexer 234 is controlled to select the C register 224. Also, the barrel shifter function multiplexer 350 is controlled to select the barrel shifter function provided by the microinstruction bus 170. This function is the shift right function. Finally, the B result bus multiplexer 246 is controlled to select the barrel shifter output bus 328, and the B result register 202 is controlled to load its input value.

Also, the data from the register specification register 608 is loaded into the register specification register 610, the data from the instruction register 614 is loaded into the instruction register 616, and the register specification registers 606 and 608 and the instruction register 614 are cleared.

Also during the cycle 4, the instruction combination unit 378 controls the flag register multiplexer 242 using the flag register multiplexer control bus 376 to select appropriate flag data for the flag register 248. In this example, the 3:1 multiplexers 242S, 242Z, 242P, and 242C are controlled to select the data generated by the barrel shifter 240 because the SHIFT instruction is executed during the cycle 4 by the barrel shifter 240, and the SHIFT instruction affects the four status bits 248S, 248Z, 248P, and 248C. Also, the 3:1 multiplexers 242O and 242A are controlled to select the data generated by the ALU 238 because the combination of the LOAD instruction and the INC instruction is executed during the cycle 4 by the ALU 238, and the INC instruction affects the status bits 248O and 248A. The instruction combination unit 378 also controls the flag register 248 to load the selected data values.

During a cycle 5, for the combination of the LOAD instruction and the INC instruction, the EAX register 402A loads the value from the A result register bus 254. Specifically, the operand source selector 218 causes the 2-to-1 multiplexer 400A to apply the signals on the A result register bus 254 to the EAX input bus 450A. Also, the operand source selector 218 causes the EAX register 402A to load the corresponding value. Again, the operand source selector 218 is responsive to data on the register specification bus 359.

Also during the cycle 5, for the SHIFT instruction, the EDX register 402C loads the value from the B result register bus 256. Specifically, the operand source selector 218 causes the 2-to-1 multiplexer 400C to apply the signals on the B result register bus 256 to the EDX input bus 450C. Also, the operand source selector 218 causes the EDX register 402C to load the corresponding value. Also, the register specification register 610 and the instruction register 616 are cleared. After the cycle 5, execution of the LOAD instruction, the INC instruction, and the SHIFT instruction is complete.

Under the circumstances described above, the present invention uses the ALU 238 to combine the LOAD instruction with the INC instruction for simultaneous execution. Also, during the same clock cycle, the SHIFT instruction is executed by the barrel shifter 240. Thus, all three instructions execute simultaneously.

The above examples of combining multiple instructions are for illustrative purposes only. A person of skill in the art will understand that numerous other instruction combinations are possible using the present invention.

The present invention is described in terms of instructions that operate on long-words. Thus, each of the conflicts that are considered involve all four bytes of the preferred 32-bit registers. However, the preferred embodiment of the present invention detects and resolves conflicts that involve less than the full four bytes of the preferred registers. Specifically, the preferred embodiment resolves conflicts on a byte, word and long-word basis. A person of skill in the art will understand that the above description also applies to conflicts that involve less than a long-word. For example, the source/destination compare unit 618 detects conflicts on a byte basis. Thus, if a first instruction stores data into bits 0 to 7 of the EAX register 402A, but the data will not generally be available until a cycle 4, and a second instruction is to read data from bits 8 to 15 of the EAX register 402A during a cycle 3, there is no operand data conflict.

The operation of the present invention is invisible to a programmer of the microprocessor 100, except that the programmer will notice increased performance by the microprocessor 100 because there will not be as many stalls in the execution of the macro-instructions.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

TABLE 1

| INSTRUCTION | CYCLE 1 | CYCLE 2 | CYCLE 3 | CYCLE 4 | CYCLE 5 |
| --- | --- | --- | --- | --- | --- |
| LOAD EAX <- MEM(DS + disp) | SEG REG <- DS | | | MIDR <- mem<br>F <- OSZAPC-F | B RES <- MIDR | EAX <- B RES |

TABLE 2

| INSTRUCTION | CYCLE 1 | CYCLE 2 | CYCLE 3 | CYCLE 4 | CYCLE 5 |
|---|---|---|---|---|---|
| LOAD EAX <- MEM(DS + disp) | SEG REG <- DS | | MIDR <- mem | B RES <- MIDR<br>F <- OSZAPC-F | EAX <- B RES |
| ADD EDX <- EDX + EBX | | A <- EDX<br>B <- EBX | A RES <- A + B<br>F <- OSZAPC-A | EDX <- A RES | |

TABLE 3

| INSTRUCTION | CYCLE 1 | CYCLE 2 | CYCLE 3 | CYCLE 4 | CYCLE 5 |
|---|---|---|---|---|---|
| LOAD EAX <- MEM(DS + disp)<br>ADD EAX <- EAX + EBX | SEG REG <- DS | A <- EAX<br>B <- EDX | MIDR <- mem<br>A <- EAX<br>B <- EDX | Null<br>A RES <- MIDR + B<br>F <- OSZAPC-A | Null<br>EAX <- A RES |

TABLE 4

| RSR 600<br>CYCLE 3 SOURCE, CYCLE 4 DEST<br>CYC 3 STAT RD, CYC 4 STAT WR | RSR 602<br>CYCLE 4 SOURCE, CYCLE 5 DEST<br>CYC 4 STAT RD, CYC 5 STAT WR<br>RSR 606<br>CYCLE 3 SOURCE, CYCLE 4 DEST<br>CYC 3 STAT RD, CYC 4 STAT WR | RSR 604<br>CYCLE 5 SOURCE, CYCLE 6 DEST<br>CYC 5 STAT RD, CYC 6 STAT WR<br>RSR 608<br>CYCLE 4 SOURCE, CYCLE 5 DEST<br>CYC 4 STAT RD, CYC 5 STAT WR<br>RSR 610<br>CYCLE 3 SOURCE, CYCLE 4 DEST<br>CYC 3 STAT RD, CYC 4 STAT WR | IR 612<br>INSTRUCTION3<br><br>IR 614<br>INSTRUCTION2<br><br>IR 616<br>INSTRUCTION1 |
|---|---|---|---|

TABLE 5

| INSTRUCTION | CYCLE 1 | CYCLE 2 | CYCLE 3 | CYCLE 4 | CYCLE 5 |
|---|---|---|---|---|---|
| LOAD EAX <- MEM(DS + disp)<br>ADD EDX <- EDX + EBX | SEG REG <- DS | A <- EDX<br>B <- EBX | MIDR <- mem<br>A RES <- A + B<br>F <- OSZAPC-A | Null<br>EDX <- A RES | Null |
| INC EAX <- EAX + 1 | | | A <- EAX<br>B <- 1 | A RES <- MIDR + B<br>F <- OSZAP-A,C-F | EAX <- A RES |

TABLE 6

| INSTRUCTION | CYCLE 1 | CYCLE 2 | CYCLE 3 | CYCLE 4 | CYCLE 5 |
|---|---|---|---|---|---|
| LOAD EAX <- MEM(DS + disp)<br>ADD EDX <- EDX + EBX | SEG REG <- DS | A <- EDX<br>B <- EBX | MIDR <- mem<br>A RES <- A + B<br>F <- OSZAPC-A | A RES <- MIDR<br>EDX <- A RES | EAX <- A RES |
| SHIFT ESI <- ESI >> ECX | | | C <- ECX<br>D <- ESI | B RES <- D >> C<br>F <- SZPC-B,OA-F | ESI <- B RES |

TABLE 7

| INSTRUCTION | CYCLE 1 | CYCLE 2 | CYCLE 3 | CYCLE 4 | CYCLE 5 |
|---|---|---|---|---|---|
| LOAD EAX <- MEM(DS + disp)<br>SHIFT EAX <- EAX >> ECX | SEG REG <- DS | C <- ECX<br>D <- EAX | MIDR <- mem<br>C <- ECX<br>D <- EAX | Null<br>B RES <- MIDR >> C<br>F <- SZPC-B,OA-F | Null<br>EAX <- B RES |

TABLE 8

| INSTRUCTION | CYCLE 1 | CYCLE 2 | CYCLE 3 | CYCLE 4 | CYCLE 5 |
|---|---|---|---|---|---|
| LOAD ECX <- MEM(DS + disp)<br>SHIFT EDX <- EDX >> ECX | SEG REG <- DS | C <- ECX<br>D <- EDX | MIDR <- mem<br>C <- ECX<br>D <- EDX | A RES <- MIDR<br>B RES <- D >> MDIR<br>F <- SZPC-B,OA-F | ECX <- A RES<br>EDX <- B RES |

TABLE 9

| INSTRUCTION | CYCLE 1 | CYCLE 2 | CYCLE 3 | CYCLE 4 | CYCLE 5 |
|---|---|---|---|---|---|
| ADD EAX <- EAX + MEM(DS + disp) | SEG REG <- DS | | A <- EAX<br>MIDR <- mem | A RES <- A + MIDR<br>F <- OSZAPC-A<br>READ F-Z | EAX <- A RES |
| JUMPZ ERROR | | JMP ADD REG <-<br>IP + ERROR | | JUMP? | |

TABLE 10

| INSTRUCTION | CYCLE 1 | CYCLE 2 | CYCLE 3 | CYCLE 4 | CYCLE 5 |
|---|---|---|---|---|---|
| ADD EAX <- EAX + MEM(DS + disp) | SEG REG <- DS | | A <- EAX<br>MIDR <- mem | A RES <- A + MIDR<br>F <- OA-A | EAX <- A RES |
| SHIFT EDX <- EDX >> ECX | | C <- ECX<br>D <- EDX | C <- ECX<br>D <- EDX | B RES <- D >> C<br>F <- SZPC-B | EDX <- B RES |

TABLE 11

| INSTRUCTION | CYCLE 1 | CYCLE 2 | CYCLE 3 | CYCLE 4 | CYCLE 5 |
|---|---|---|---|---|---|
| LOAD EAX <- MEM(DS + disp) | SEG REG <- DS | | MIDR <- mem | Null | Null |
| INC EAX <- EAX + 1 | | A <- EAX<br>B <- 1 | A <- EAX<br>B <- 1 | A RES <- MIDR + B<br>F <- OA-A | EAX <- A RES |
| SHIFT EDX <- EDX >> ECX | | | C <- ECX<br>D <- EDX | B RES <- D >> C<br>F <- SZPC-B | EDX <- B RES |

What is claimed is:

1. A pipelined microprocessor, said microprocessor executing a first instruction and a second instruction from a computer program, said microprocessor decoding said first instruction to determine a data destination for said first instruction at least one clock cycle before said microprocessor decodes said second instruction to determine a data source for said second instruction, said microprocessor being connected to an external memory, said microprocessor comprising a data register, said data destination of said first instruction requiring that said microprocessor load the contents of a memory location of said external memory into said data register, said data source of said second instruction requiring that said microprocessor perform an operation on the contents of said data register and load the results of said operation back into said data register, said microprocessor comprising:

- a memory data register for receiving the contents of said memory location after the contents are read from memory and before the contents are loaded into said data register;
- an ALU for performing operations on data, said ALU receiving the contents of said memory data register;
- a source/destination compare unit which compares said data destination of said first instruction with said data source of said second instruction, said source/destination compare unit detecting a data access conflict between said data destination of said first instruction and said data source of said second instruction that would cause said microprocessor to read said data register for said second instruction before the contents of said memory location are written into said data register for said first instruction; and
- an instruction compare unit responsive to the detection of said data access conflict by said source/destination compare unit, said instruction compare unit determining that said first instruction and said second instruction can be combined for simultaneous completion of execution in said ALU, said instruction compare unit controlling said microprocessor so that said ALU performs said operation required by said second instruction on the contents of said memory location as received directly from said memory data register and loads the result of said operation into said data register.

2. An apparatus for increasing the execution speed of a microprocessor that executes pipelined instructions wherein a data source for a current instruction may be a destination for a previous instruction, said apparatus comprising:

- an instruction control unit which sequentially fetches said previous instruction and decodes said previous instruction at least one clock cycle before decoding said current instruction, said instruction control unit beginning execution of said previous instruction before beginning execution of said current instruction;
- a source/destination field comparator which compares a source field designating said data source of said current instruction with a destination field designating said data destination of said previous instruction, said source/destination field comparator providing a first active output signal that indicates when said source field and said destination field are identical;
- an operation field comparator that compares a first operation field of said current instruction with a second operation field of said previous instruction, said operation field comparator providing a second active output signal when said first and second operation fields are compatible; and
- an instruction combining circuit that is activated on concurrence of said first active output signal and said second active output signal to combine an operation performed by said microprocessor in response to said first operation field with an operation performed by said microprocessor in response to said second operation field, the data for said data destination being produced as the data for said data source, such that said current instruction does not stall and said current instruction completes execution during a same operational cycle as said previous instruction.

3. The apparatus of claim 2, wherein said first operation field and said second operation field are compatible when said previous instruction is a data load from a memory location to an internal register of said microprocessor.

4. The apparatus of claim 2, additionally comprising a first operating unit, wherein when said first operation is combined with said second operation so that said first and second operations occur during said same operational cycle, and wherein said first operating unit performs said first operation and said second operation during said same operational cycle.

5. The apparatus of claim 4, additionally comprising a second operating unit, wherein when said first operating unit performs said first operation and said second operation during said same operational cycle, and wherein said second operating unit performs a third operation during said same operational cycle.

6. The apparatus of claim 2, additionally comprising a flag register and a flag register multiplexer, said flag register storing status data resulting from the performance of operations in a plurality of status bits, said flag register multiplexer individually selecting status data for each of said plurality of status bits in said flag register, wherein when said first and said second operations on data are performed during a same instruction cycle, and wherein said flag register multiplexer selects status data resulting from the execution of said first operation and status data resulting from the execution of said second operation so as to reflect the same status as if said second and said first operations on data were performed in successive instruction cycles.

7. A method for increasing the execution speed of a processor having pipelined instruction execution wherein a current instruction may have a data source corresponding to a data destination of a previous instruction, said method comprising the steps of:

sequentially fetching and decoding said previous instruction and said current instruction, said decoding of said current instruction occurring at least one clock cycle after said decoding of said previous instruction;

beginning execution of said previous instruction based upon said decoding of said previous instruction at least one clock cycle before beginning execution of said current instruction based upon said decoding of said current instruction;

comparing a source field designating said data source of said current instruction with a destination field designating said data destination of said previous instruction to determine whether said source field and said destination field select a same data storage location;

comparing a first operation field of said current instruction with a second operation field of said previous instruction to determine whether said first and second operation fields are compatible such that said first and second operation fields select respective first and second operations which can be performed at the same time on data; and when said source field and said destination field select said same data storage location and said first and second operations are compatible, producing the data for said data destination as the data for said data source such that said current instruction does not stall and said current instruction completes execution during a same operational cycle as said previous instruction; and when said source field and said destination field select said same data storage location and said first and second operations are not compatible, stalling said current instruction until the data for said data destination of said previous instruction has been provided.

8. The method of claim 7 including an additional step of, when said first and said second operations on data are performed during a same instruction cycle, multiplexing status bits resulting from the execution of said first operation with status bits resulting from the execution of said second operation for loading into a flag register to reflect the same status as if said second and said first operations on data were performed in successive instruction cycles.

9. An operational unit of a pipelined microprocessor for performing operations on a set of data values according to a computer program, said microprocessor connected to a memory, said memory containing a first data value, said microprocessor comprising a plurality of registers, said computer program containing a first instruction which requires that said first data value be loaded from said memory into a first register of said plurality of registers, said computer program containing a second instruction which requires that a first operation be performed on said first data value from said first register to generate a second data value, said operational unit decoding said first instruction to determine whether said first register is a destination for said first instruction at least one clock cycle before decoding said second instruction to determine whether said first register is a source for said second instruction, said operational unit initiating execution of said first instruction before initiating execution of said second instruction, said operational unit comprising:

a first memory data multiplexer, said first memory data multiplexer receiving data from said memory and from said first register, said first memory data multiplexer selecting between said data received from said memory and said data received from said first register;

one or more operating units for performing programmer specified operations on said set of data values, wherein said first data value passes through an operating unit before said first data value is loaded into said first register, a first operating unit of said one or more operating units receiving said data selected by said first memory data multiplexer; and a conflict detection unit, said conflict detection unit comprising:
a source/destination comparator, said source/destination comparator detecting when both of the following conditions are satisfied:
(1) said first register is both a source for said second instruction and a destination for said first instruction; and
(2) said first data value has not yet passed through an operating unit for the execution of said first instruction when said second instruction is ready to operate on said first data value from said first register; and
an instruction comparator, said instruction comparator being responsive to said source/destination comparator, said instruction comparator determining whether execution of said second instruction can be initiated before execution of said first instruction is completed, said instruction comparator controlling said first memory data multiplexer to select said first data value received from said memory and controlling said first operating unit to perform said first operation required by said second instruction to generate said second data value, so that portions of said first and second instructions are executed simultaneously and said first and second instructions are completed during a same operational cycle.

10. The operational unit of claim 9, wherein said second instruction requires that said second data value be loaded back into said first register, wherein said microprocessor loads said second data value into said first register so that said first data value is not loaded into said first register.

11. The operational unit of claim 9, additionally comprising a second memory data multiplexer, said second memory data multiplexer receiving data from said memory and from said first register, said second memory data multiplexer selecting between said data received from said memory and said data received from said first register, wherein:

a second operating unit of said one or more operating units receives said data selected by said second memory data multiplexer;

said second instruction requires that said second data value be loaded into a second register;

said microprocessor loads said second data value into said second register;

said instruction comparator controls said second memory data multiplexer to select said first data value received from said memory and controls said second operating unit to pass said first data value through said second operating unit without said first operating unit performing any operation on said first data value; and said microprocessor loads said first data value into said first register after said first data value passes through said second operating unit.

12. The operational unit of claim 9, additionally comprising a second memory data multiplexer, said second memory data multiplexer receiving data from said memory and from said first register, said second memory data multiplexer selecting between said data received from said memory and said data received from said first register, wherein:

a second operating unit of said one or more operating units receives said data selected by said second memory data multiplexer;

said second instruction requires that said second data value be loaded into a second register;

said computer program additionally includes a third instruction that requires that a second operation be performed on said first data value from said first register to generate a third data value that is to be loaded back into said first register;

execution of said second instruction is initiated before execution of said third instruction is initiated;

said microprocessor loads said second data value into said second register;

said instruction comparator controls said second memory data multiplexer to select said first data value received from said memory and controls said second operating unit to perform said second operation required by said third instruction to generate said third data value, so that the first, second and third instructions are executed simultaneously; and said microprocessor loads said third data value into said first register so that said first data value is not loaded into said first register.

13. The operational unit of claim 9, additionally comprising a memory input data register for storing said first data value after said first data value is read from said one memory location and before said first data value is passed through said first operating unit, wherein said memory data multiplexer receives said data from said one memory location through said memory input data register.

14. The operational unit of claim 9, wherein:

said instruction comparator generates a function code that represents said operation required by said second instruction;

said operational unit additionally comprises a function multiplexer for selecting a function code for communication to said first operating unit, said function multiplexer selecting between a function code specified at a micro-instruction bus and said function code generated by said instruction comparator;

said function code communicated to said first operating unit determines which operation is performed by said first operating unit; and said instruction comparator controls said first operating unit to perform said operation required by said second instruction by controlling said function multiplexer to select said function code generated by said instruction comparator for communication to said first operating unit.

15. The operational unit of claim 9, wherein each of said operating units generates a set of current status bits during each operation, said operational unit additionally comprising:

a flag register for storing a set of stored status bits related to prior operations performed by said operating units; and a flag register multiplexer for selecting a plurality of status bits from said sets of current status bits for storage in said flag register, said flag register multiplexer selecting said plurality of status bits so that said stored status bits are the same as if said first instruction and said second instruction were executed in succession.

16. A pipelined microprocessor for executing a plurality of instructions, said microprocessor being capable of executing portions of multiple instructions simultaneously, said microprocessor initiating operation of a single instruction at a time by decoding a first instruction in said plurality of instructions at least one clock cycle before decoding a second instruction in said plurality of instructions, said microprocessor comprising:

a first operating unit which performs operations required by said plurality of instructions, said first instruction initiated first by said microprocessor, said first instruction requiring a first operation which can only be performed by said first operating unit;

a second operating unit for performing operations required by said plurality of instructions, said second instruction initiated by said microprocessor at least one clock cycle after said first instruction is initiated, said second instruction requiring a second operation which can only be performed by said second operating unit, a third instruction of said plurality of instructions initiated by said microprocessor at least one clock cycle after said second instruction is initiated, said third instruction requiring a third operation which can be performed by said first operating unit or by said second operating unit; and an operating unit controller for controlling said first and second operating units to perform operations as required by said plurality of instructions, said controller controlling said first operating unit to perform said third operation when said second operation can be performed during a same clock cycle as said third operation to allow simultaneous completion of execution of said second and third instructions, said controller controlling said second operating unit to perform said third operation when said first operation can be performed during a same clock cycle as said third operation to allow simultaneous completion of execution of said first and third instructions.

17. The microprocessor of claim 16, wherein:
said first operating unit comprises an ALU;
said second operating unit comprises a barrel shifter;
said first instruction comprises an add instruction;
said second instruction comprises a shift instruction; and
said third instruction comprises a memory load instruction.

* * * * *